(12) United States Patent
Venugopal et al.

(10) Patent No.: US 7,929,426 B2
(45) Date of Patent: Apr. 19, 2011

(54) APPARATUS AND METHOD FOR DESIGNING RING COVERS

(75) Inventors: Nandagopal Venugopal, Plano, TX (US); Aruna Apte, Dallas, TX (US)

(73) Assignee: Verizon Business Global LLC, Basking Ridge, NJ (US)

(*) Notice: Subject to any disclaimer, the term of this patent is extended or adjusted under 35 U.S.C. 154(b) by 1531 days.

(21) Appl. No.: 10/797,029

(22) Filed: Mar. 11, 2004

(65) Prior Publication Data

US 2005/0204033 A1   Sep. 15, 2005

(51) Int. Cl.
 H04L 12/26 (2006.01)
 H04L 12/28 (2006.01)
 H04L 12/56 (2006.01)

(52) U.S. Cl. .................. 370/222; 370/258; 370/406

(58) Field of Classification Search .......... None
 See application file for complete search history.

(56) References Cited

U.S. PATENT DOCUMENTS

| | | | |
|---|---|---|---|
| 5,546,542 A * | 8/1996 | Cosares et al. | 709/241 |
| 6,819,662 B1 * | 11/2004 | Grover et al. | 370/351 |
| 7,075,892 B2 * | 7/2006 | Grover et al. | 370/238 |
| 7,133,410 B2 * | 11/2006 | Chow et al. | 370/404 |
| 2002/0036988 A1 * | 3/2002 | Cardwell et al. | 370/238 |
| 2003/0009598 A1 * | 1/2003 | Gunluk et al. | 709/251 |

OTHER PUBLICATIONS

Linda Morales Gardner et al.: "Net Solver: A Software Tool for the Design of Survivable Networks," Proceedings from IEEE GLOBECOM; 1995; pp. 926-930.

J.B. Slevinsky et al.: "An Algorithm for Survivable Network Design Employing Multiple Self-healing Rings," Proceedings on IEEE GLOBECOM; 1993; pp. 1568-1573.

L.M. Gardner et al.: "Techniques for Finding Ring Covers in Survivable Networks," Proceedings on IEEE GLOBECOM; 1994; pp. 1862-1866.

Jeff Kennington et al.: "Optimization Based Algorithms for Finding Minimal Cost Ring Covers in Survivable Networks," *Computational Optimization and Applications*, 14; 1999 Kluwer Academic Publishers; pp. 219-230.

* cited by examiner

*Primary Examiner* — Chirag G Shah
*Assistant Examiner* — Suk Jin Kang

(57) ABSTRACT

A system and method are provided for designing ring cover candidates for a network. A ring cover candidate is generated based on configuration information and traffic demand information associated with the network. The ring cover candidate includes a group of rings, where each ring includes a group of network spans. In some implementations consistent with the principles of the invention, a report including characteristics of a ring cover candidate may be generated.

27 Claims, 31 Drawing Sheets

Cover Summary

| | | |
|---|---|---|
| Total Rings: | 349 | Total Distance (in miles): 201,817.7 |
| Total Spans: | 885 | Loaded Spans: 645 |

Fig. 17

| Ring ID | Nodes | Length (in miles) |
|---|---|---|
| A65D200040 | 5 | 1,703.7 |

Fig. 18

```
                            1900
Component No: ⌒90⌐
              1904      1906        1908         1910
         ⌜1594    ⌜RPT⌝  ⌜UNT⌝   ⌜23.000000⌝    ⌜1⌝
1902  ⎨   1291     RPT    MTR     35.000000      1
         ⌞485     CPL    RPT      4.500000       0⌟
Total Spans  3 ⎬ 1912
Total Loaded Spans    2 ⎬ 1914
```

Fig. 19

| TOPOLOGICAL BRIDGES | | | | |
|---|---|---|---|---|
| Span ID | From | To | Length (in miles) | Load |
| 615 | DNG | PSI | 20.90 | 668 |
| 1367 | NOR | ZNR | 0.10 | 273 |
| 1666 | WTP | SDW | 16.00 | 228 |
| 262 | BOS | BSN | 0.10 | 203 |
| 981 | HTW | SDW | 0.50 | 164 |
| 840 | GLE | GLN | 5.50 | 161 |

Fig. 21

STATISTICS

| Cover | Recommended | Option A | Option B | Base |
|---|---|---|---|---|
| Length of the cover (in miles) | 206416 | 210483 | 220403 | 64527 |
| Maximum coverable spans | 1412 | 1412 | 1412 | 1412 |
| # of spans covered | 882 | 863 | 882 | 393 |
| % of spans covered | 62.46 | 61.12 | 62.46 | 27.83 |
| Max coverable loaded spans | 734 | 734 | 734 | 734 |
| # of loaded spans covered | 645 | 645 | 645 | 217 |
| % of loaded spans covered | 87.87 | 87.87 | 87.87 | 29.56 |
| Total length of loaded spans | 73608 | 73608 | 73608 | 20715 |
| # of rings | 350 | 348 | 379 | 137 |

Fig. 23

PERFORMANCE MEASURES

| Cover | Recommended | Option A | Option B | Base |
|---|---|---|---|---|
| Ave Load/Ring | 279.33 | 280.94 | 257.96 | 265.89 |
| Ave Length/Ring | 589.76 | 604.84 | 581.54 | 471.00 |
| Ave Loaded Spans/Ring | 1.84 | 1.85 | 1.70 | 1.58 |
| Ave Loaded Spn-Length/Ring | 210.31 | 211.52 | 194.22 | 151.21 |
| Loaded Spn-Length/Ring-Length | 0.36 | 0.35 | 0.33 | 0.32 |
| Load/Ring-Length | 0.47 | 0.46 | 0.44 | 0.56 |

Fig. 25

RING RANKINGS FOR COVER RECOMMENDED

| | SPANS | | | BENEFIT/COST RANKING | | | | |
|---|---|---|---|---|---|---|---|---|
| ID | MILES | TOTAL | LOADED | UNIQUE RANK | WBC | Cum. Benefit | Cum. Cost | CBC Ratio |
| B0000171 | 93.30 | 3 | 3 | 3 | 1.00 | 1.00 | 93.30 | 93.30 | 1.00 |
| A3DF00418 | 12.50 | 2 | 2 | 2 | 1.00 | 1.00 | 205.6 | 205.6 | 1.00 |
| B0000092 | 522.80 | 2 | 1 | 1 | 0.50 | 1.00 | 758.70 | 758.80 | 1.00 |
| A3DD321735 | 992.80 | 5 | 5 | 2 | 0.40 | 0.90 | 2081.70 | 2082. | 1.00 |
| A3DF00877 | 444.50 | 5 | 4 | 4 | 0.80 | 0.84 | 2569.70 | 2645.90 | 0.97 |
| A3DD301249 | 1085.60 | 6 | 6 | 1 | 0.17 | 0.64 | 8647.20 | 9813.50 | 0.88 |
| A3DD200893 | 666.90 | 5 | 4 | 3 | 0.60 | 0.58 | 16066.40 | 20220.00 | 0.79 |
| A3DD322669 | 701.40 | 5 | 2 | 1 | 0.20 | 0.00 | 71966.91 | 18174.03 | 0.40 |

Fig. 26

APPARATUS AND METHOD FOR DESIGNING RING COVERS

TECHNICAL FIELD

The invention pertains to communication networks. In particular, the invention pertains to designing ring covers for communication networks.

BACKGROUND OF THE INVENTION

A ring is a network configuration in which devices are connected in a circular pathway. A SONET (Synchronous Optical Networks) ring uses devices that detect a failed ring span and instantaneously restore traffic between the affected nodes using an alternate path provided on the ring. The restoration occurs in milliseconds and hence SONET rings may be called self-healing rings. Ideally, each node in the network is included in a ring and the rings are designed to maximize coverage of loaded network spans at a low cost.

A ring cover is a set of rings that cover a set of network spans. Existing networks have ring covers that are designed manually. The manual design process is very time consuming and is influenced by a designer's experience and bias. It may take a ring designer as much as one week to design a network having thirty rings. With the increasing size and complexity of telecommunication networks, the number of possible ring combinations that can be generated may be upwards of 3,000,000. It would be impossible to manually examine such a large set of rings and extract an efficient ring cover from it. Hence there is a need for an automated system to help engineers with the process of identifying rings/ring covers that will best meet their network needs.

SUMMARY OF THE INVENTION

A method and a system are provided for generating a ring cover for a network based on network configuration information and traffic demand information.

In one aspect of the invention, network configuration information of a network and traffic demand information are received. A ring cover candidate is generated based on the network configuration information and the traffic demand information. The ring cover candidate includes a group of rings, each of which includes a group of network spans.

In a second aspect of the invention, an apparatus is provided for designing at least one ring cover candidate for a network. The apparatus includes at least one storage device configured to store instructions and at least one processor configured to execute the instructions to generate the at least one ring cover candidate based on configuration information and traffic demand information associated with the network.

In a third aspect of the invention, a system is provided for identifying at least one ring cover candidate for a network. The system includes means for receiving network configuration information of the network and information representing predicted traffic demand and means for generating a group of ring cover candidates based on the network configuration and the information representing predicted traffic demand. The group of ring cover candidates includes a group of rings. Each of the rings includes a group of network spans.

In a fourth aspect of the invention, a machine-readable medium having instructions recorded thereon for execution by at least one processor is provided. The instructions include instructions for the at least one processor to generate a group of ring cover candidates for a network by using a different procedure to generate a respective group of rings for each of the ring cover candidates. The generation of the ring cover candidates is based on configuration information and information representing predicted traffic demand associated with the network. Each of the rings includes a group of network spans. Each of the ring cover candidates are compared and one of the ring cover candidates is selected as a recommended ring cover candidate based on the predicted traffic demand of network spans covered by each of the ring cover candidates.

BRIEF DESCRIPTION OF THE DRAWINGS

The accompanying drawings, which are incorporated in and constitute a part of this specification, illustrate embodiments of the invention and, together with the description, explain the invention. In the drawings.

FIG. 17 shows an exemplary cover summary report that may be generated by the ring designer tool of FIG. 2;

FIG. 18 shows an exemplary cover report that may be generated by the ring designer tool of FIG. 2;

FIG. 19 shows an exemplary component report that may be generated by the ring designer tool of FIG. 2;

FIG. 21 shows an exemplary uncovered spans report that may be generated by the ring designer tool of FIG. 2;

FIG. 23 shows an exemplary cover comparison statistics report that may be generated by the ring designer tool of FIG. 2;

FIG. 25 shows an exemplary cover comparison performance measures report that may be generated by the ring designer tool of FIG. 2; and FIG. 26 shows an exemplary ring ranking report that may be generated by the ring designer tool of FIG. 2.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Exemplary Systems

Figure 1:
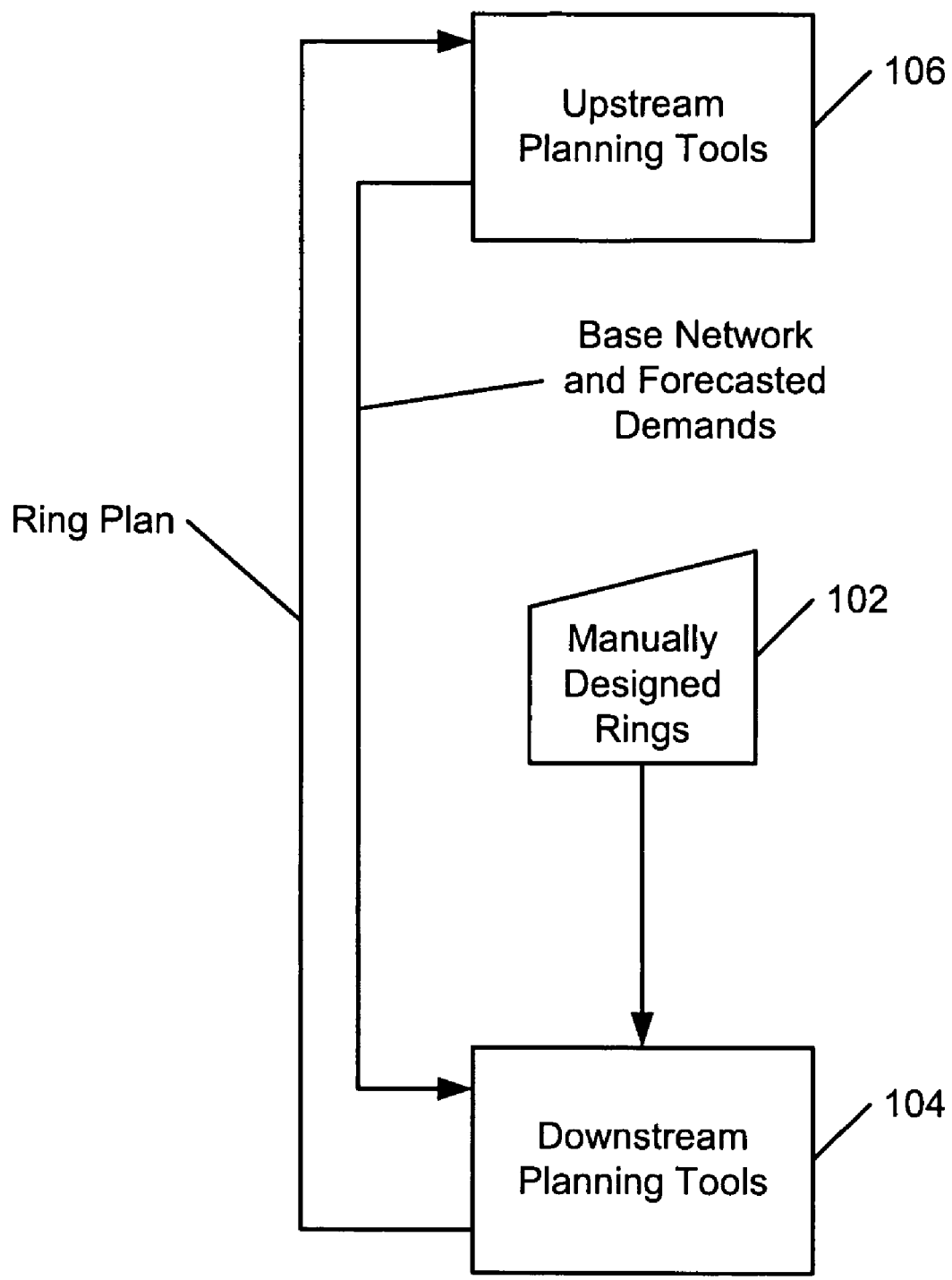
FIG. 1 depicts an exemplary system that uses manually designed rings.

FIG. 1 depicts an exemplary network planning system 100. System 100 includes manually designed rings 102, one or more downstream planning tools 104 and one or more upstream planning tools 106.

Manually designed rings 102 may be in a form that can be input to one or more downstream planning tools 104. The input may be in electronic form, such as in a file or in a database, such as a central database that may be accessible to one or more downstream planning tools 104 and one or more upstream planning tools 106.

Downstream planning tools 104 may optimize the rings, ring-layers, and add-drop multiplexer (ADM) placement of manually designed rings 102. Optimized routes from downstream planning tools 104 and the optimized rings are fed to one or more upstream planning tools 106, which may input a base network configuration and forecasted traffic demand to downstream planning tools 104.

Figure 2:
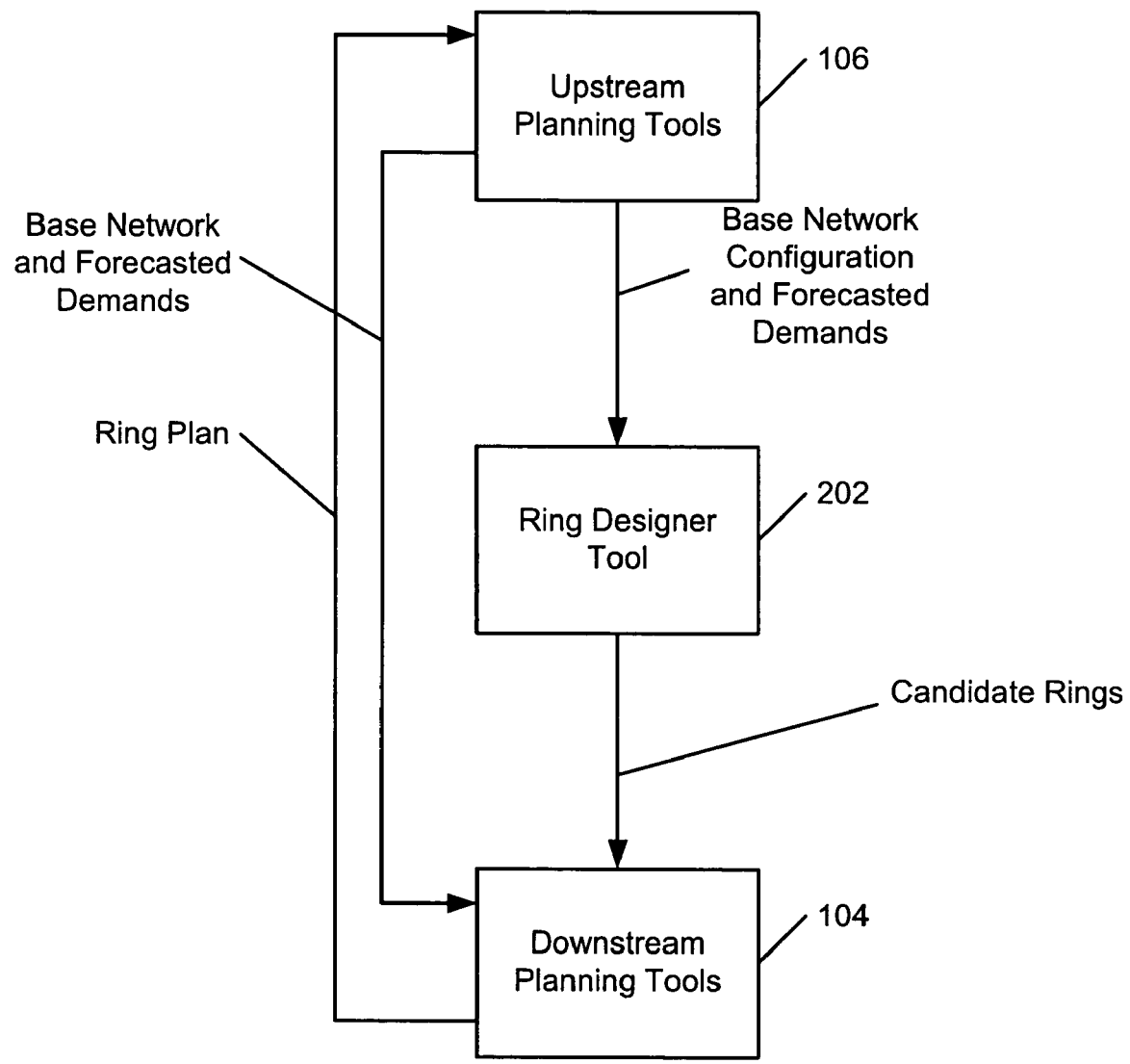
FIG. 2 depicts an exemplary system consistent with the principles of the invention.

FIG. 2 depicts an exemplary network planning system 200 consistent with the principles of the invention. System 200 may include one or more upstream planning tools 106, one or more downstream planning tools 104 and a ring designer tool 202.

Ring designer tool 202 may receive a base network configuration and forecasted traffic demand. The base network configuration and forecasted demand may be in electronic form, such as a file or as part of a database that may be accessible by ring designer tool 202 and downstream planning tools 104.

The base network configuration may include a location of base nodes and may include information regarding network spans connecting the base nodes. A network span is a portion of a network that directly connects two nodes. The base network configuration may also include information regarding components of the network, such as network span components. An example of network span components may include types of cables and a quantity of cables used in the span.

Forecasted traffic demand may include a unit of communication capacity that is predicted to be required for communications on the network. The unit of communication capacity may be, for example, a particular multiplexer level, optical carrier (OC) (e.g. OC-1, OC-12), Digital Signal Level (DS) (e.g. DS-3), and the like. Forecasted traffic demand may also include a source site identifier, a destination site identifier and a time that the demand for communication capacity is predicted to occur, such as, for example, the first quarter of 2006.

Figure 3:
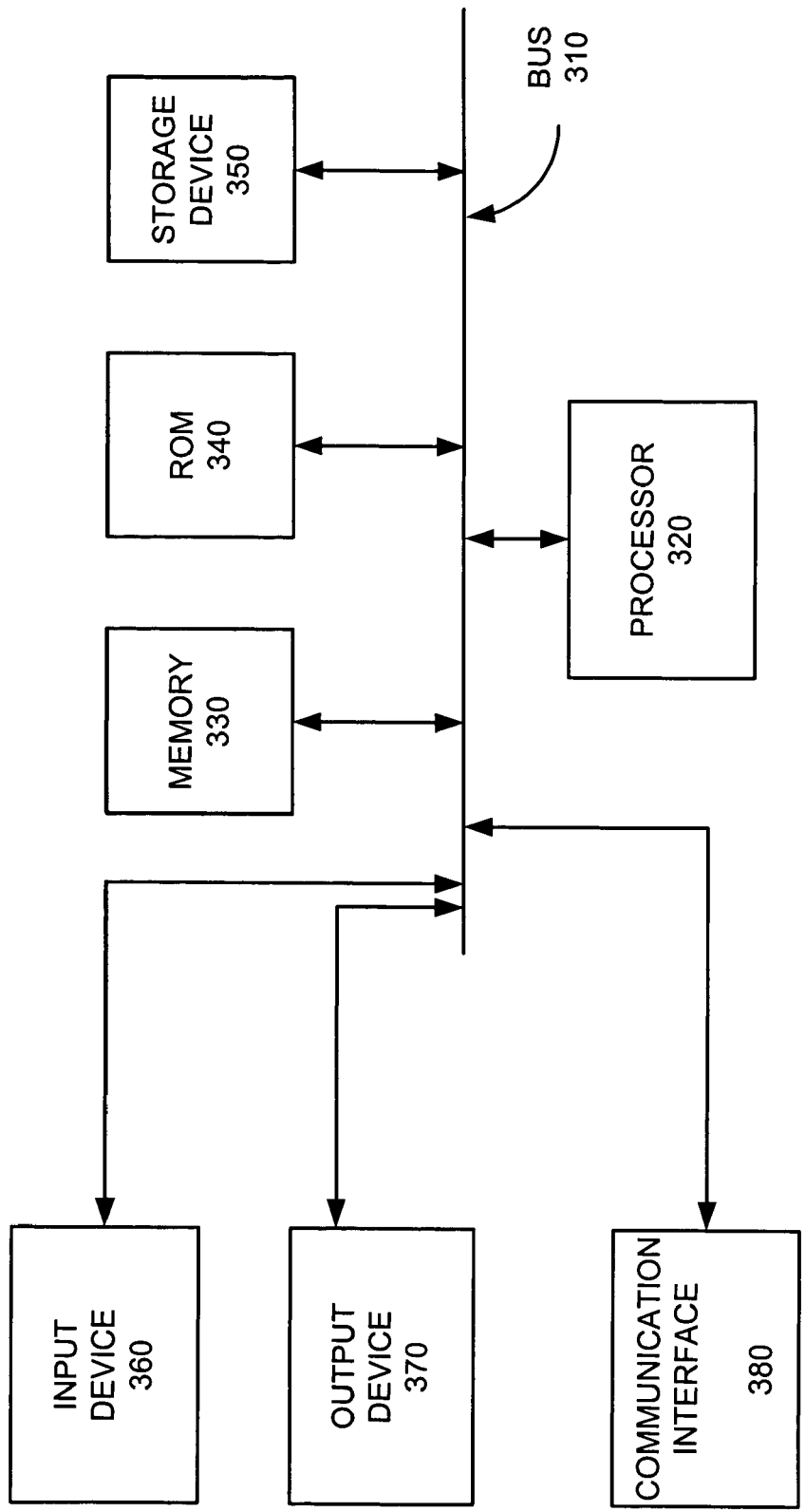
FIG. 3 illustrates an exemplary system that may be used to implement aspects of the system of FIG. 2.

FIG. 3 illustrates an exemplary system 300 in which methods and systems consistent with the invention may be implemented. A separate system 300 may be used, for example, to implement each of ring designer tool 202, each downstream planning tool 104 and each upstream planning tool 106. In one implementation, ring designer tool 202, one or more of downstream planning tools 104 and/or one or more of upstream planning tools 106 may be implemented on a single physical system 300.

System 300 may include a bus 310, a processor 320, a memory 330, a read only memory (ROM) 340, a storage device 350, an input device 360, an output device 370, and a communication interface 380. Bus 310 permits communication among the components of system 300.

Processor 320 may include one or more conventional processors or microprocessors that interpret and execute instructions. Memory 330 may be a random access memory (RAM) or another type of dynamic storage device that stores information and instructions for execution by processor 320. Memory 330 may also store temporary variables or other intermediate information used during execution of instructions by processor 320. ROM 340 may include a conventional ROM device or another type of static storage device that stores static information and instructions for processor 320. Storage device 350 may include any type of magnetic or optical recording medium and its corresponding drive, such as a magnetic disk or optical disk and its corresponding disk drive.

Input device 360 may include one or more conventional mechanisms that permit a user to input information to system 300, such a keyboard, a mouse, a pen, a biometric mechanism, such as a voice recognition device, etc. Output device 370 may include one or more conventional mechanisms that output information to the user, including a display, a printer, one or more speakers, etc. Communication interface 380 may include any transceiver-like mechanism that enables system 300 to communicate via a network. For example, communication interface 380 may include a modem or an Ethernet interface for communicating via a local area network (LAN). Alternatively, communication interface 380 may include other mechanisms for communicating with other devices and/or systems via wired, wireless or optical connections.

System 300 may perform functions in response to processor 320 executing sequences of instructions contained in a computer-readable medium, such as memory 330. A computer-readable medium may include one or more memory devices and/or carrier waves. Such instructions may be read into memory 330 from another computer-readable medium, such as storage device 350, or from a separate device via communication interface 380.

Execution of the sequences of instructions contained in memory 330 may cause processor 320 to perform certain acts that will be described hereafter. In alternative implementations, hard-wired circuitry may be used in place of or in combination with software instructions to implement the present invention. In still other implementations, various acts may be performed manually, without the use of system 300. Thus, the present invention is not limited to any specific combination of hardware circuitry and software.

Spanning Trees and Fundamental Rings

As used herein, a spanning tree is a minimally connected network having no rings. A spanning tree of a connected network, having n nodes and m spans, has n−1 spans. As set forth above, a span is a portion of a network that directly connects two nodes. A chord is a span that, when added to a spanning tree, creates a ring. The ring created by adding the chord to the spanning tree is known as a fundamental ring (FR).

Figure 4A:
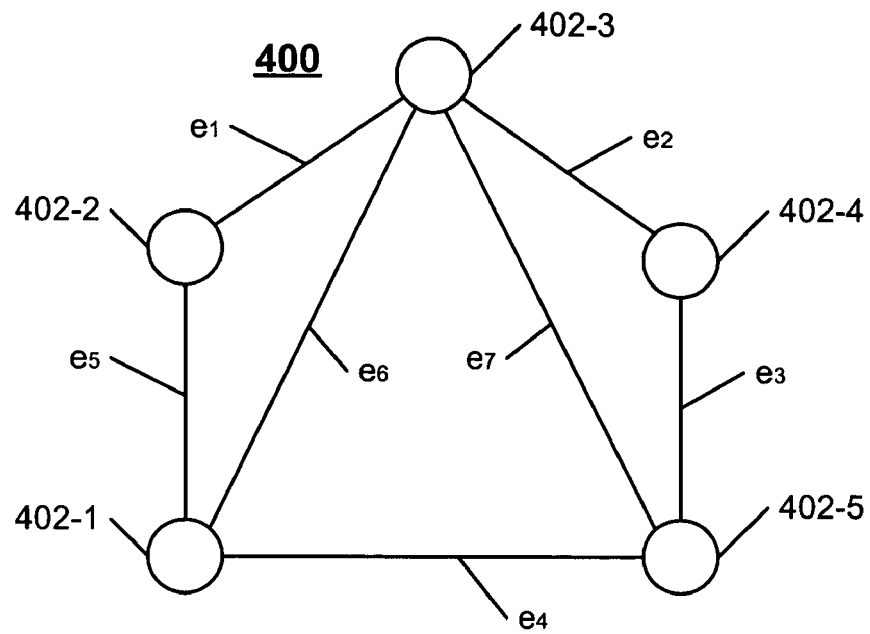
FIGS. 4A-4C illustrate an exemplary connected network, an exemplary spanning tree based on the connected network, and an exemplary fundamental ring, respectively.
Figure 4B:
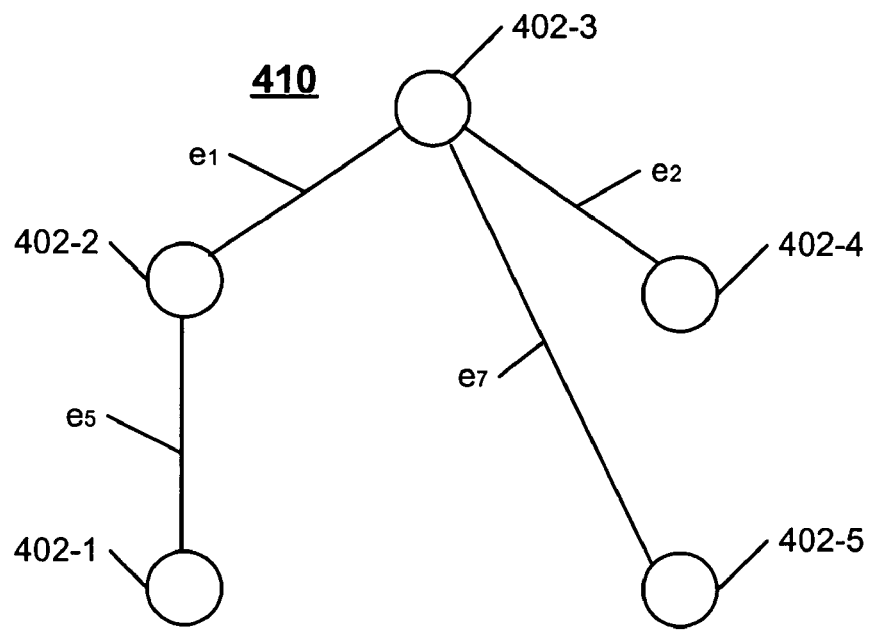
Figure 4C:
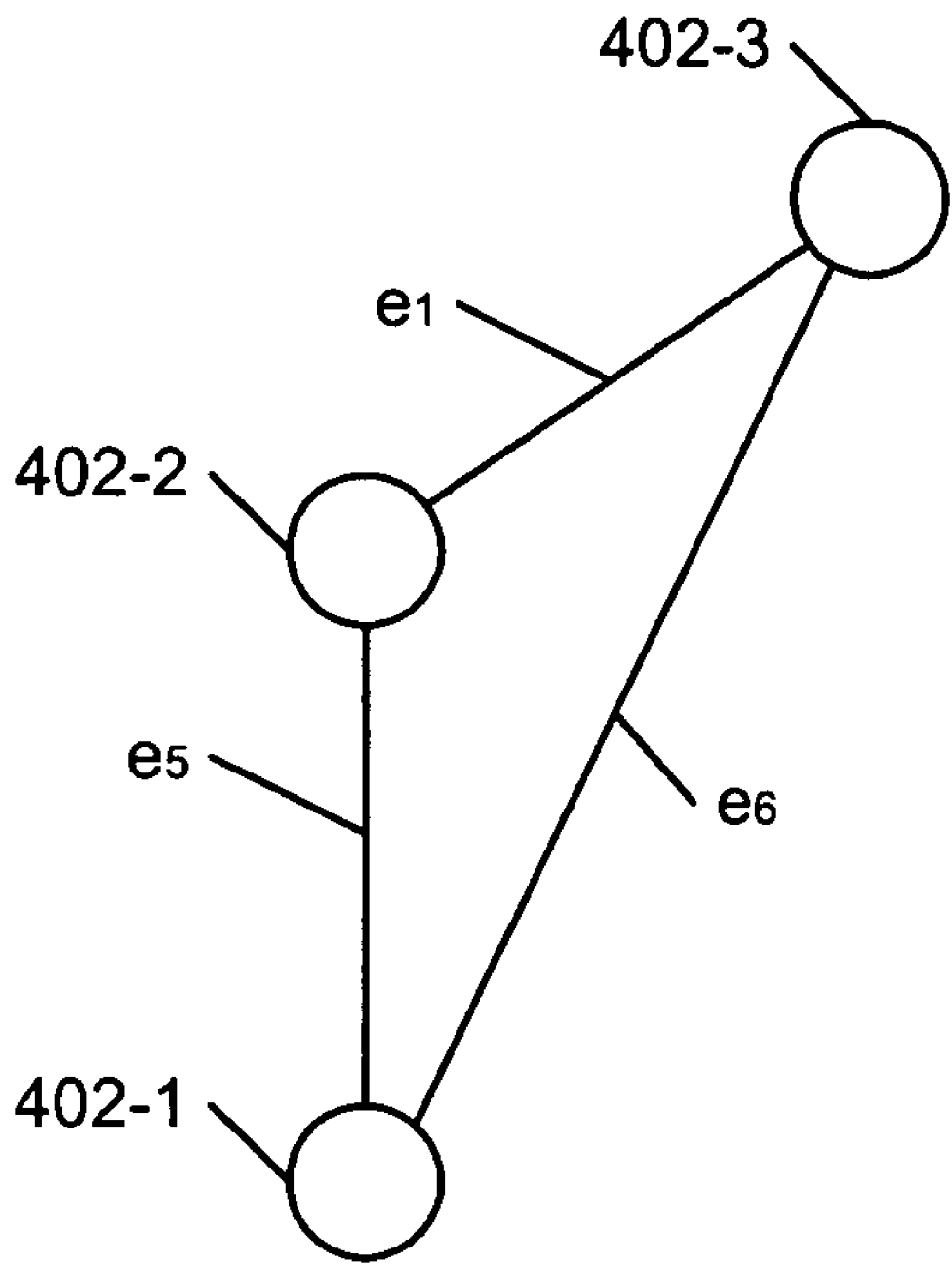

FIG. 4A illustrates an exemplary connected network 400 having five nodes 402-1-402-5. Connected network 400 has seven spans $e_1$-$e_7$. FIG. 4B illustrates an exemplary spanning tree 410 generated from connected network 400. Spanning tree 410 includes five nodes and four spans. Thus, one can easily see that n=5 with respect to spanning tree 410. That is, spanning tree 410 has n (5) nodes and n−1 (4) spans. The remaining spans, $e_3$, $e_4$ and $e_6$ are chords with respect to spanning tree 410. FIG. 4C illustrates a FR $e_1$, $e_5$, $e_6$ formed by adding chord $e_6$ to spanning tree 410. When a spanning tree is generated based on a maximum number of loaded spans (spans having forecasted traffic demand), the generated FRs are considered high traffic rings.

Combining two or more FRs may also yield a ring. Such rings are called derived second degree (D2R) rings. A simple ring is a ring in which all nodes are of degree 2. That is, each node on the ring has exactly two spans of the ring incident upon it. The ring shown in FIG. 4C is an example of a simple ring. All rings in a ring cover generated by ring designer tool 202 may be simple rings. Thus, undesirable rings, such as folded rings and other structures may be excluded from a ring cover solution.

Ring Designer Tool Operation

Figure 5A:
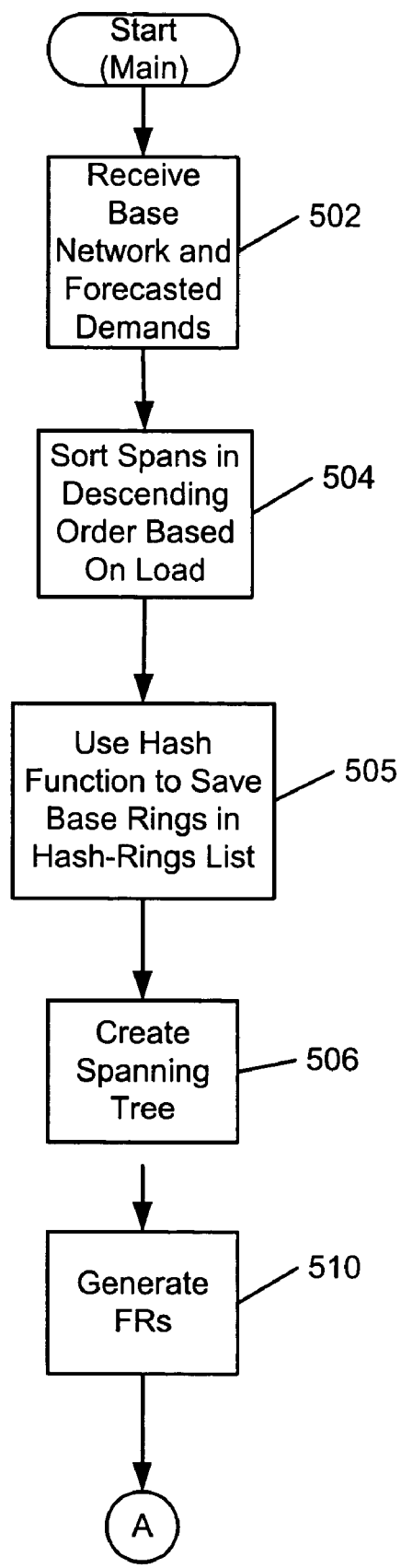
FIGS. 5A-5B are high-level flowcharts that illustrate an exemplary process for generating ring cover candidates and reports that may be implemented in a ring designer tool of FIG. 2 consistent with the principles of the invention.
Figure 5B:
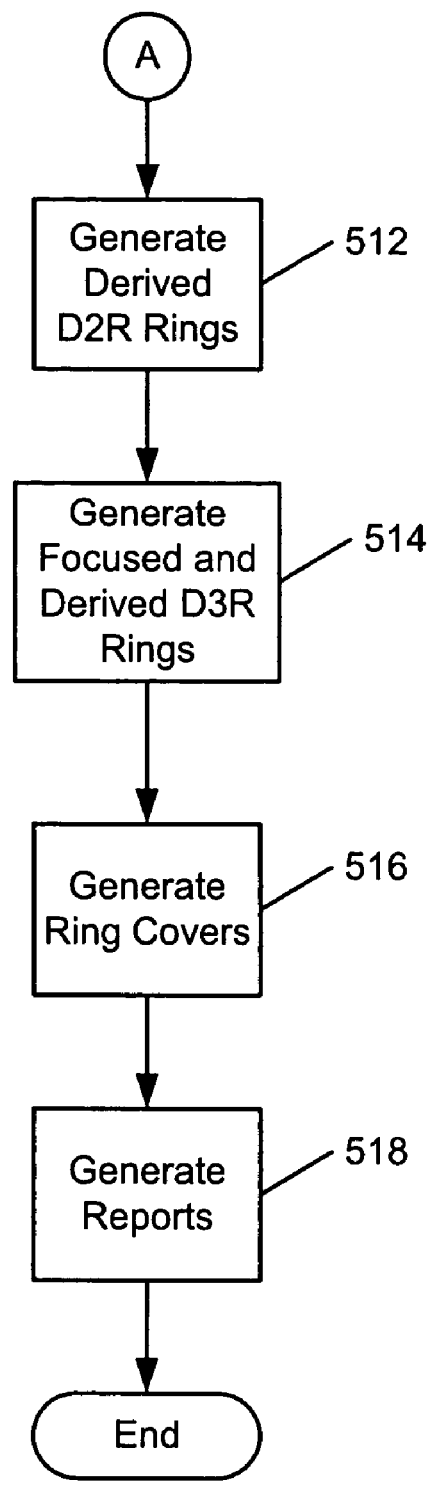

FIGS. 5A-5B are flowcharts that illustrate an exemplary process that may be implemented in ring designer tool 202. Processing may begin with ring designer tool 202 receiving a base network configuration and forecasted traffic demand information (act 502). Ring designer tool 202 may sort network spans in the base network configuration. For example, in one implementation, ring designer tool 202 may sort the network spans in descending order based on load or demand (act 504).

Base rings are rings that are included in the existing network. Ring designer tool 202 may save the base rings, which may be included as part of the received base network configuration, in a hash-rings list according to a hash function (act 505). Storing the base rings in this manner makes retrieval of base ring information for various reports easier and faster for ring designer tool 202. Ring designer tool 202 may then create a spanning tree based on the network configuration (act 506).

Creation of Spanning Tree

Figure 6:
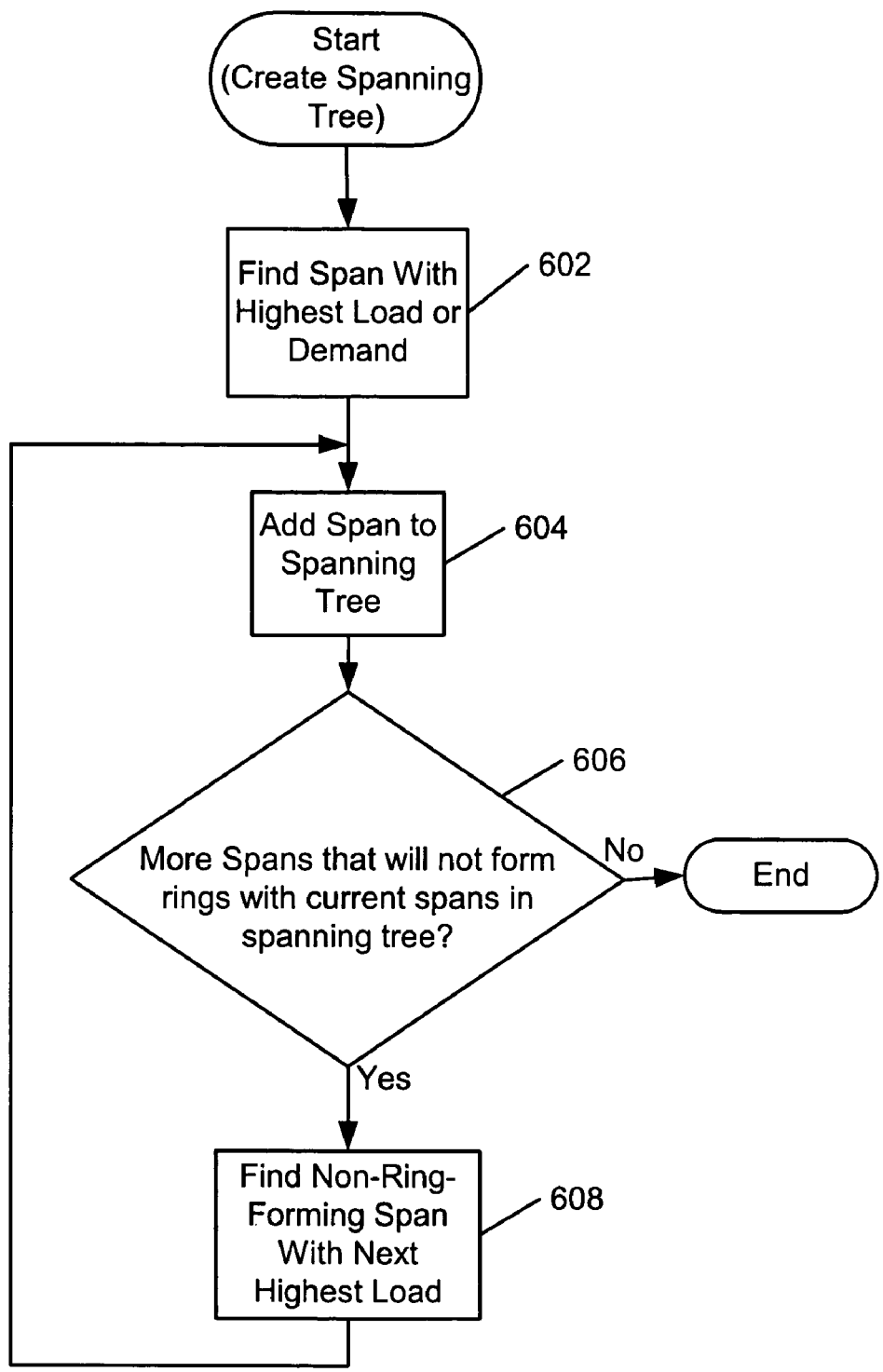
FIG. 6 illustrates a flowchart of an exemplary process that may be implemented in the ring designer tool of FIG. 2 for creating a spanning tree.

A number of well-known methods exist for creating a spanning tree from a connected network of nodes. FIG. 6 illustrates, in detail, an exemplary procedure for creating a spanning tree (act 506). Processing may begin with ring designer tool 202 identifying the network span having a highest forecasted network load or demand (act 602). Because ring designer tool 202 previously sorted the network spans in descending order based on load (act 504), the span having the highest forecasted load is at the beginning of the sorted network span list. When two or more spans have a same load that is higher than other loads of other spans, ring designer tool 202 may select one of the two or more spans having the shortest length. Ring designer tool 202 may then add the selected span to the spanning tree (act 604).

Ring designer tool 202 may then determine whether there are any additional network spans, not currently in the spanning tree, which will not form a ring with the current spans in the spanning tree (act 606). If there is such a span, ring designer tool 202 may find the span having the highest load that is not in the spanning tree and that will not cause a ring to be formed (act 608). Ring designer tool 202 may continue building the spanning tree until there are no more spans in the network that are not part of the spanning tree and that will not cause a ring to be formed when added to the spanning tree (acts 604, 606, 608). Once the number of spans in the spanning tree is equal to one less than the number of nodes in the network, no additional spans may be added to the spanning tree without creating a ring. Ring designer tool 202 then may generate all possible FRs by adding chords to the spanning tree (act 510: FIG. 5).

Generation of Fundamental Rings

Figure 7:
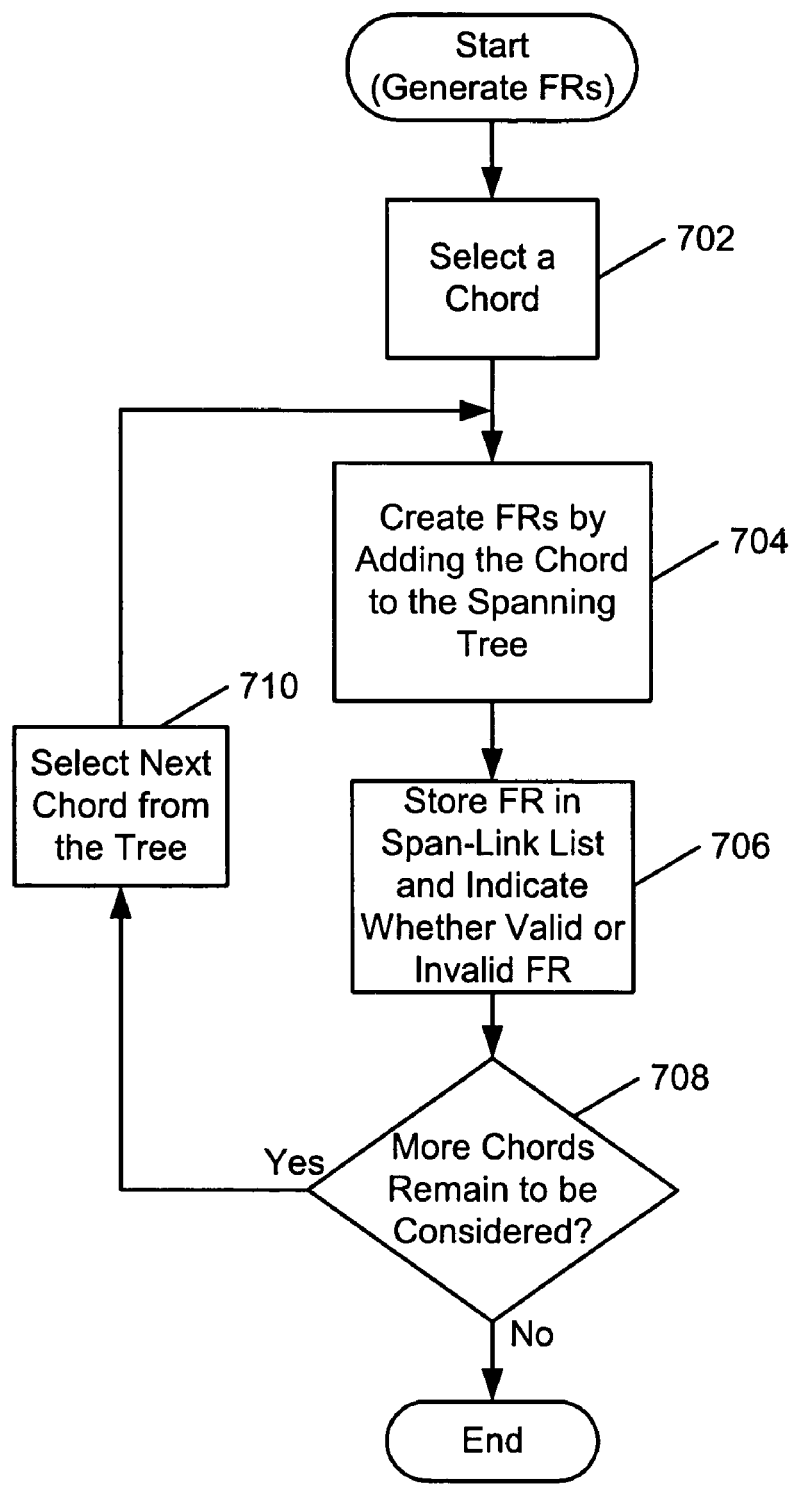
FIG. 7 illustrates a flowchart of an exemplary process that may be implemented in the ring designer tool of FIG. 2 for creating fundamental rings.

FIG. 7 is an exemplary procedure that may be implemented by ring designer tool 202 to generate all possible FRs that may be formed from the created spanning tree, as performed in act 510. Processing may begin with ring designer tool 202 selecting a chord (act 702). Ring designer tool 202 then may create FRs by adding the selected chord to the spanning tree (act 704). Ring designer tool 202 may store the generated FRs in a span linked list for each span covered by a respective FR (act 706). The span linked list links each representation of a network span to a linked list of one or more rings that cover the represented span. Each FR entry in the span linked list may indicate the spans included in the ring and whether the FR is valid or invalid. A ring may be determined to be valid if it satisfies pre-configured business rules and diversity rules, while an invalid ring fails to satisfy the business rules and the diversity rules. An example of a business rule may be: all rings must have a mileage less that 150 miles. An example of a diversity rule may be: all spans included in a ring must be diverse. That is, no two ring spans have a common mod section. A mod section is the smallest point-to-point level underlying a transmission system. The mod section represents the physical items in the network, including regenerator sites and splice points. Additionally, the Ring designer tool 202 may also determine if the ring formed is a simple ring.

Ring designer tool 202 may then determine whether any chords remain to be considered for FR generation (act 708). If more chords remain, ring designer tool 202 may select a next chord (act 710). Ring designer tool 202 may create an additional FR using the selected chord, making sure that no duplicate rings are created (acts 704 through 710) until all FRs are created.

Returning to FIG. 5B, ring designer tool 202 may generate all valid derived D2R rings (act 512). A D2R ring is a ring created from combining two FRs (valid or invalid). Ring designer tool 202 may combine only those FRs that have a common span. This has the effect of pruning a potentially vast solution space. A common span assures physical proximity and therefore, practicality of the ring architecture. For example, referring to FIGS. 4A and 4B, FR $e_1$, $e_5$, $e_6$ and FR $e_4$, $e_6$, $e_7$ may be combined to form a D2R ring because they have a common span $e_6$. The resulting D2R ring is $e_1$, $e_5$, $e_4$, $e_7$. The ring $e_1$, $e_5$, $e_4$, $e_7$ is valid if it satisfies the business and diversity rules.

Generation of Valid D2R Rings

Figure 8:
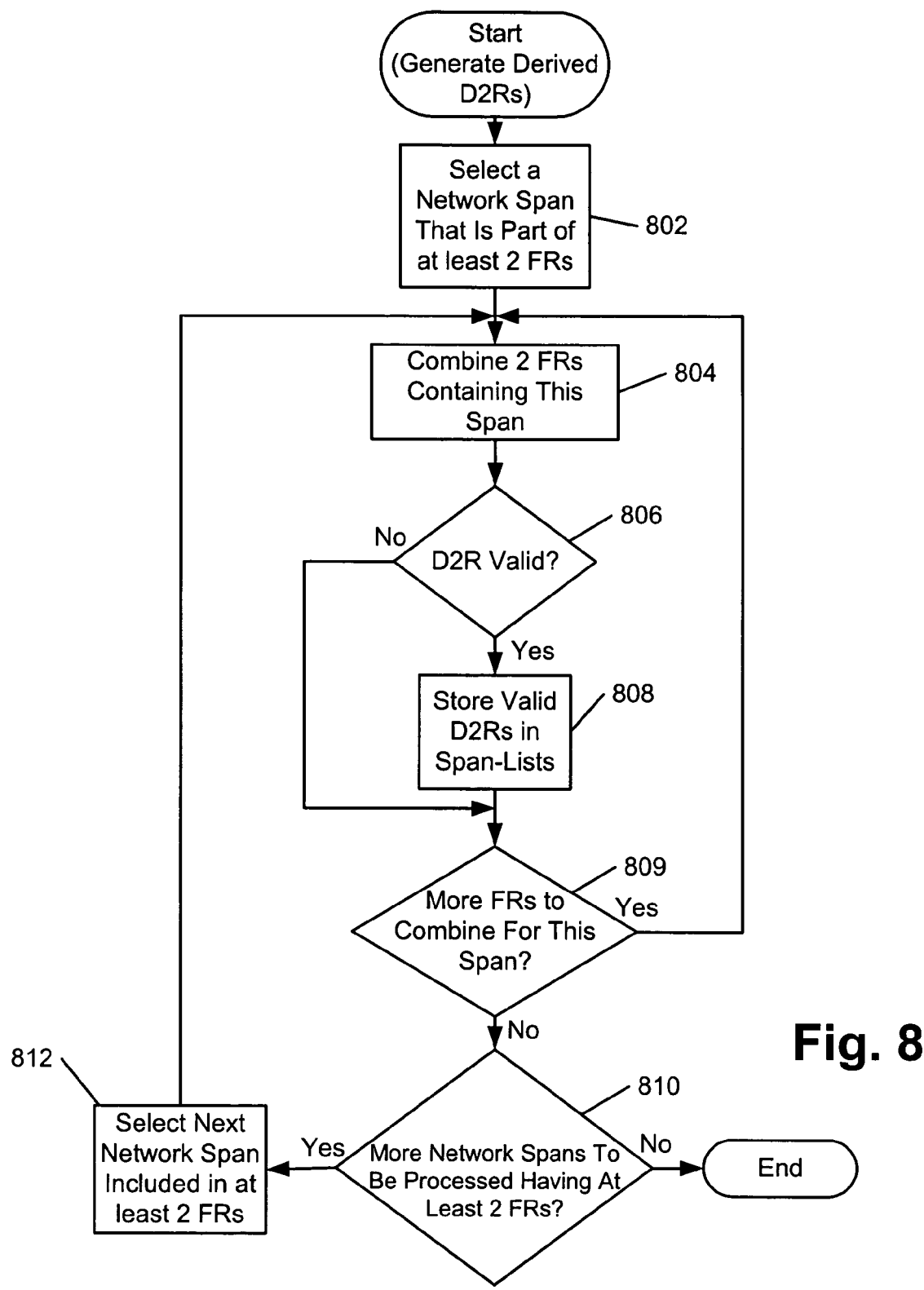
FIG. 8 illustrates a flowchart of an exemplary process that may be implemented in the ring designer tool of FIG. 2 for generating derived second degree rings.

FIG. 8 illustrates an exemplary procedure that ring designer tool 202 may perform to generate derived D2R rings. Processing may begin with ring designer tool 202 selecting a network span that is part of at least 2 FRs (act 802). By traversing the span linked list for the selected span, ring designer tool 202 may find all two-FR combinations that have the selected span in common and can be combined (act 804). For each such combination of two FRs, ring designer tool 202 may determine whether the resulting D2R ring is valid (whether the D2R ring satisfies the business and diversity rules) (act 806). If the D2R ring is valid, then the D2R ring is stored in span linked lists of D2R rings for all spans covered by the D2R ring (act 808). Next, ring designer tool 202 may determine whether there are additional FRs to combine that include the span (act 809). If there are additional FRs that include the span, processing proceeds to act 804. Otherwise, ring designer tool 202 may then determine whether other network spans, having at least 2 FRs through them, are yet to be considered (act 810). If such spans exist, then one such span is selected (act 812) and processing returns to act 804. The process continues until no additional network spans can be found that are covered by at least 2 FRs.

Returning to FIG. 5B, ring designer tool 202 may generate focused and derived third degree (D3R) rings (act 514). A D3R ring is a ring that is created by combining three FRs. When combining FRs, ring designer tool 202 may combine only those FRs having a span in common. For example, when combining 3 FRs, an FR, FR1, may be combined with another FR, FR2, if both FRs have a span in common and the combined D2R formed by combining FR1 and FR2 may be combined with a third FR, FR3, if FR3 has a span in common with the combined D2R. The resulting ring is a derived D3R ring.

A span that is not covered by any valid rings is called a bridge. A bridge that is covered only by one or more invalid FRs is called an algorithmic bridge, while a bridge that is not covered by any rings, valid or invalid, is called a topological bridge. By adjusting the business or diversity rules, an algorithmic bridge span may become covered by one or more valid FRs.

Before declaring a span to be an algorithmic bridge, ring designer tool 202 may attempt to generate a focused D3R ring to cover the span. Ring designer tool 202 may generate a focused D3R ring by combining an invalid FR, including the span of the possible algorithmic bridge, with two valid FRs that do not cover the possible bridge span. If a valid focused D3R ring is generated, ring designer tool 202 may store the valid focused D3R in the span linked lists of the covered spans. For example, with reference to FIG. 4A, assume that ring $e_4$, $e_6$, $e_7$ is an invalid FR ring that covers span $e_4$, no valid FRs cover span $e_4$ and that rings $e_1$, $e_5$, $e_6$ and $e_2$, $e_3$, $e_7$ are valid FRs that do not cover span $e_4$. Then ring $e_1$, $e_5$, $e_6$, ring $e_4$, $e_6$, $e_7$ and ring $e_2$, $e_3$, $e_7$ can be combined to form ring $e_1$, $e_2$, $e_3$, $e_4$, $e_5$, which may be a valid ring that covers span $e_4$. If a valid ring cannot be generated to cover a span (e.g. span $e_4$), ring designer tool 202 may designate the span as an algorithmic bridge.

Generation of Valid Derived and Focused D3R Rings

Figure 9A:
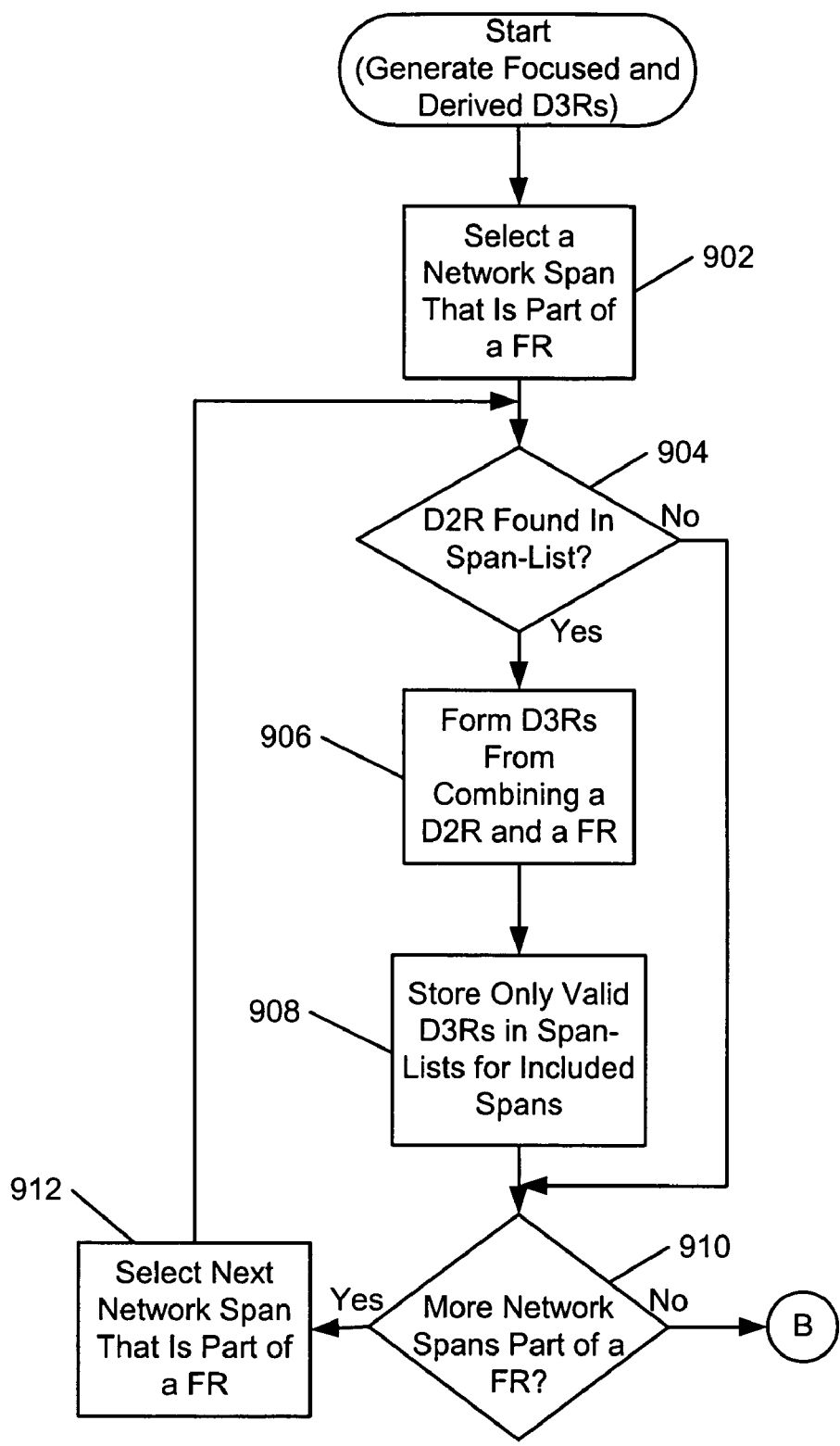
FIGS. 9A-9B illustrate flowcharts of an exemplary process that may be implemented in the ring designer tool of FIG. 2 for generating focused and derived third degree rings.
Figure 9B:
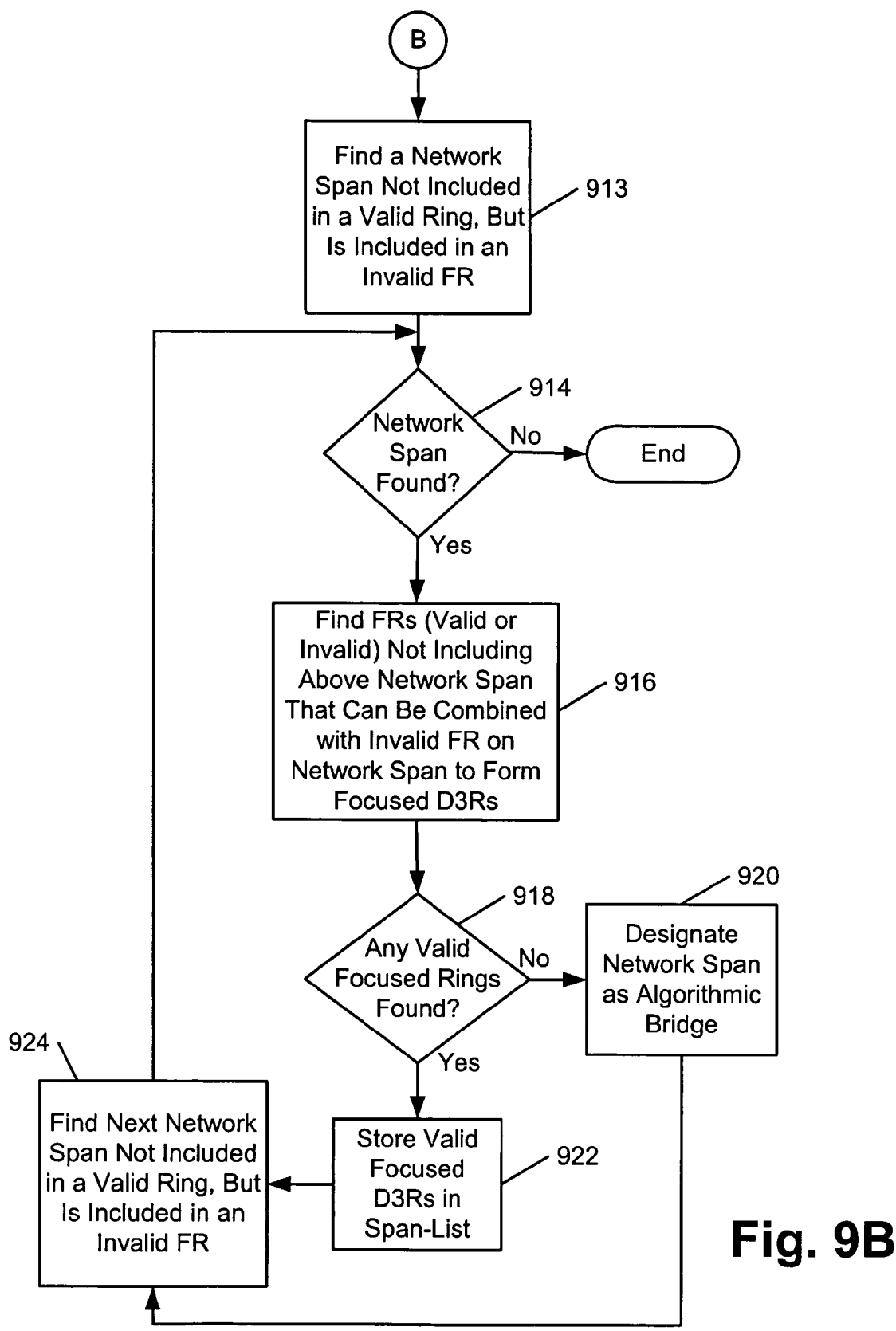

FIGS. 9A-9B are flowcharts that illustrate an exemplary procedure that may be used by ring designer 202 to generate focused and derived rings, as performed in act 514. Processing may begin with ring designer tool 202 selecting a network span that is covered by a FR (act 902). Ring designer tool 202 may check the span linked list for the selected span to determine whether the span is covered by a valid D2R ring (act 904). If the span is covered by a D2R ring, then ring designer tool 202 may determine all of the valid derived D3R rings that can be formed by combining a valid D2R ring with a valid or invalid FR that includes the selected span (act 906). Ring designer tool 202 may store any resulting valid D3R rings in span linked lists of spans covered by respective valid D3R rings (act 908). Ring designer tool 202 may then determine whether there are any other network spans that include a FR (act 910) and if such a span exists, the ring designer tool 202 may select the next network span that is covered by a FR (act 912) and may again determine whether any D2R rings cover the selected span (act 904). The above process continues until no additional network spans can be found that are covered by a valid or invalid FR that have not already been considered by this procedure (act 910).

Ring designer tool 202 may then find a network span that is covered by one or more invalid FRs, but is not covered by any other rings (act 913). Ring designer 202 may then determine whether such a span was found (act 914) and, if so, ring designer 202 may use the span linked lists to find all combinations of two FRs (valid or invalid) that do not include the found span and can be combined with the invalid FR that covers the found span to produce one or more valid focused D3R rings that include the found span (act 916). Ring designer tool 202 may then check whether any valid focused D3Rs were found (act 918) and if so, ring designer tool 202 may store the valid focused D3Rs in span linked lists of the spans covered by the focused D3R ring (act 922). If no valid focused D3R rings are found, then ring designer tool 202 may designate the span as an algorithmic bridge (act 920). Ring designer tool 202 may then attempt to find a next network span covered only by one or more invalid FRs (act 924). Ring designer tool 202 may then determine whether a next span was found (act 914). Processing may continue until no additional network spans can be found that are covered only by one or more invalid FRs.

At this point, ring designer tool 202 now has a list of all valid and invalid FRs, valid D2R rings and valid focused and derived D3R rings. Referring back to FIG. 5B, ring designer 202 may then generate several candidate ring covers (act 516).

Ring designer tool 202 may use several algorithms to generate the ring covers. In one implementation, a smart cover, a greedy cover and a smart-greedy cover are generated. The smart cover algorithm attempts to first generate highly loaded, but cheap rings. Cheapness can be determined by ring length. The shorter the ring, the cheaper the ring. The greedy cover algorithm attempts to generate cheap rings that cover a maximum number of spans. The smart-greedy algorithm attempts to generate rings by using candidate rings generated by the greedy cover algorithm and applying the "smart" method of using the cheapest rings from the greedy cover candidate rings to generate the smart-greedy cover.

Ring Cover Generation

Figure 10:
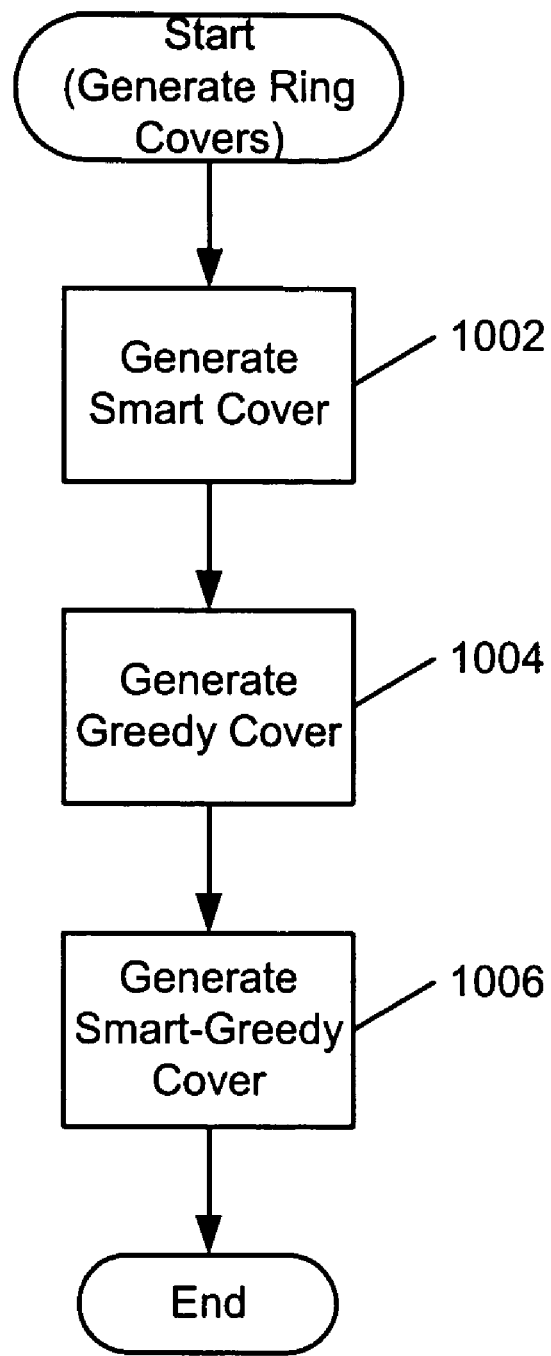
FIG. 10 illustrates a flowchart of an exemplary high-level process that may be implemented in the ring designer tool of FIG. 2 for generating ring cover candidates.

FIG. 10 illustrates an exemplary procedure that may be used by ring designer tool 202 to generate multiple candidate ring covers. Ring designer tool 202 may generate a smart cover (act 1002), a greedy cover (act 1004) and a smart-greedy cover (act 1006).

Figure 11:
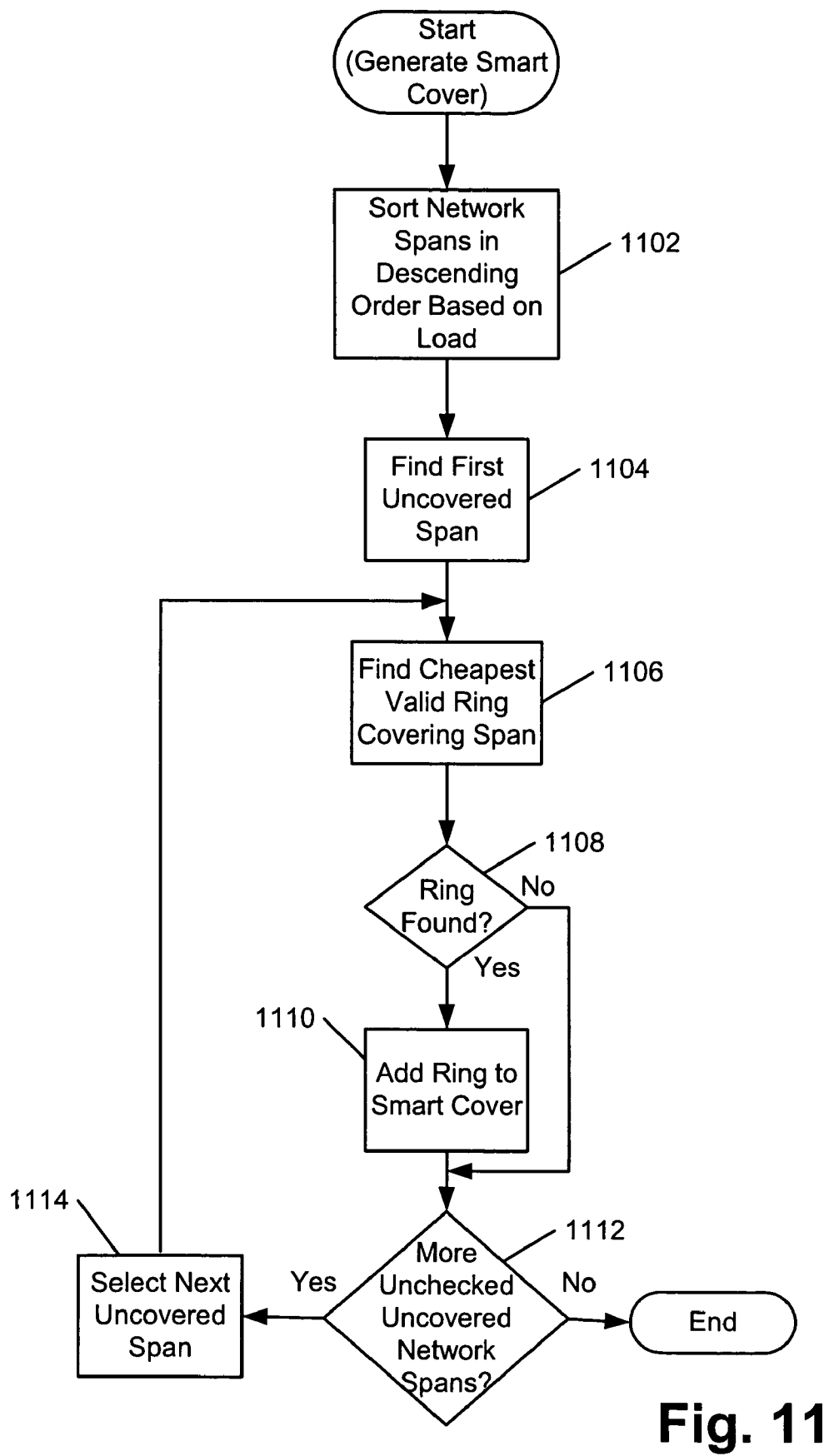
FIG. 11 illustrates a flowchart of an exemplary process that may be implemented in the ring designer tool of FIG. 2 for generating a ring cover candidate using a smart ring cover algorithm.

FIG. 11 illustrates an exemplary procedure that ring designer 202 may perform to generate a smart ring cover (act 1002: FIG. 10). Ring designer 202 may sort the network spans in descending order based on load (act 1102). Thus, the heaviest loaded spans will appear at the beginning of the sorted network spans. Ring designer 202 may then traverse the sorted span list, starting from the beginning of the sorted network spans, to find a network span not covered by a ring (act 1104). Ring designer tool 202 may then search the span linked list of the found span to find a cheapest (shortest) valid ring that covers the found span (act 1106). Ring designer tool 202 may then determine whether the cheapest ring was found (act 1108) and if so, ring designer tool 202 may add the cheapest ring to the ring cover and all spans covered by the ring are flagged as covered (act 1110). As previously mentioned, cheapness can be measured by ring length. Ring designer tool 202 may then determine whether there are any other network spans not covered by a valid ring (act 1112) and if so, ring designer tool 202 may select the next uncovered span (act 1114). Ring designer tool 202 may again attempt to find a cheapest valid ring that covers the uncovered span (act 1106), and if found (act 1108) adds the candidate ring to the smart cover (act 1110). Ring designer tool 202 may continue adding rings to the cover until all uncovered network spans have been considered.

Figure 12:
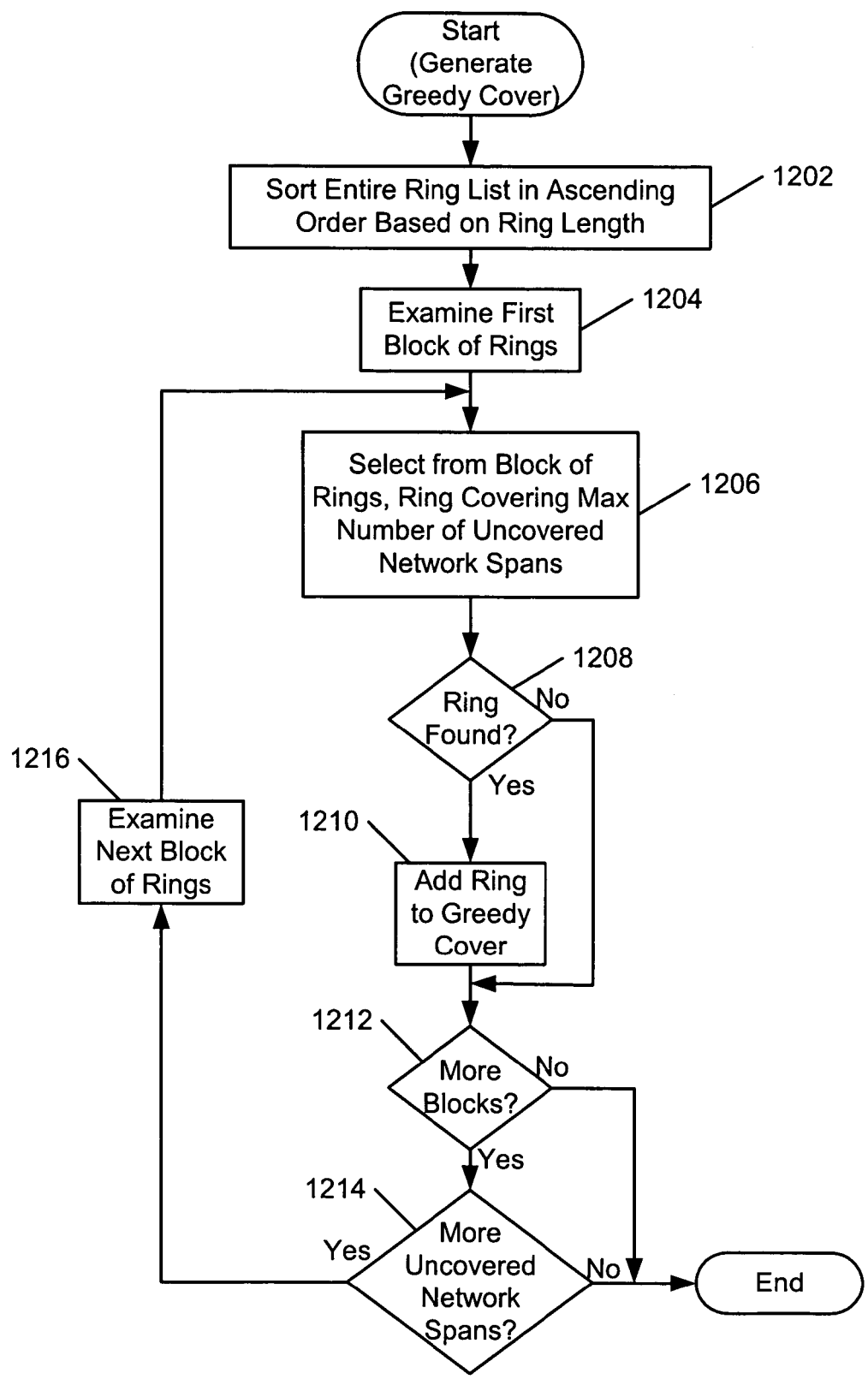
FIG. 12 illustrates a flowchart of an exemplary process that may be implemented in the ring designer tool of FIG. 2 for generating a ring cover candidate using a greedy ring cover algorithm.

FIG. 12 illustrates an exemplary procedure that ring designer 202 may perform to generate the greedy ring candidate (act 1004: FIG. 10). Ring designer tool 202 may sort the entire list of valid candidate rings in ascending order based on length of the ring (act 1202). Thus, the shortest rings appear first in the sorted list of candidate rings. Ring designer tool 202 may examine the candidate rings one block at a time, starting from the top of the sorted candidate list (act 1204). In this context, a block is a group contiguous candidate rings in the sorted list of candidate rings. A length of the block may vary to arrive at a locally best result. The block length may be, for example, 5. Ring designer tool 202 may select, from the block of ring candidates, the ring covering the maximum number of uncovered network spans (act 1206). When there is a tie between two or more ring candidates (i.e., when two or more ring candidates from the block cover the same maximum number of uncovered spans), ring designer tool 202 may select the ring candidate having the shortest length.

Ring designer tool 202 may then determine whether a candidate ring was selected from the block of rings (act 1208). If a ring candidate was selected, ring designer tool 202 may add the ring candidate to the greedy ring cover and may flag all spans covered by the ring as covered spans (act 1210). Ring designer tool 202 may then check whether additional blocks of ring candidates exist (act 1212). If no additional blocks of ring candidates exist, the procedure ends. Otherwise, ring designer tool 202 may determine whether additional uncovered network spans exist (act 1214). If no additional uncovered network spans exist, the procedure ends, otherwise, ring designer tool 202 may examine the next block of rings (act 1216). If there is less than a full block of ring candidates remaining to be examined, then ring designer tool 202 may treat the remaining ring candidates as a full block of ring candidates. Ring designer tool 202 may continue adding cheapest rings covering a maximum number of uncovered spans to the greedy ring cover until either all blocks of ring candidates have been considered by ring designer tool 202 or no uncovered network spans remain.

Figure 13:
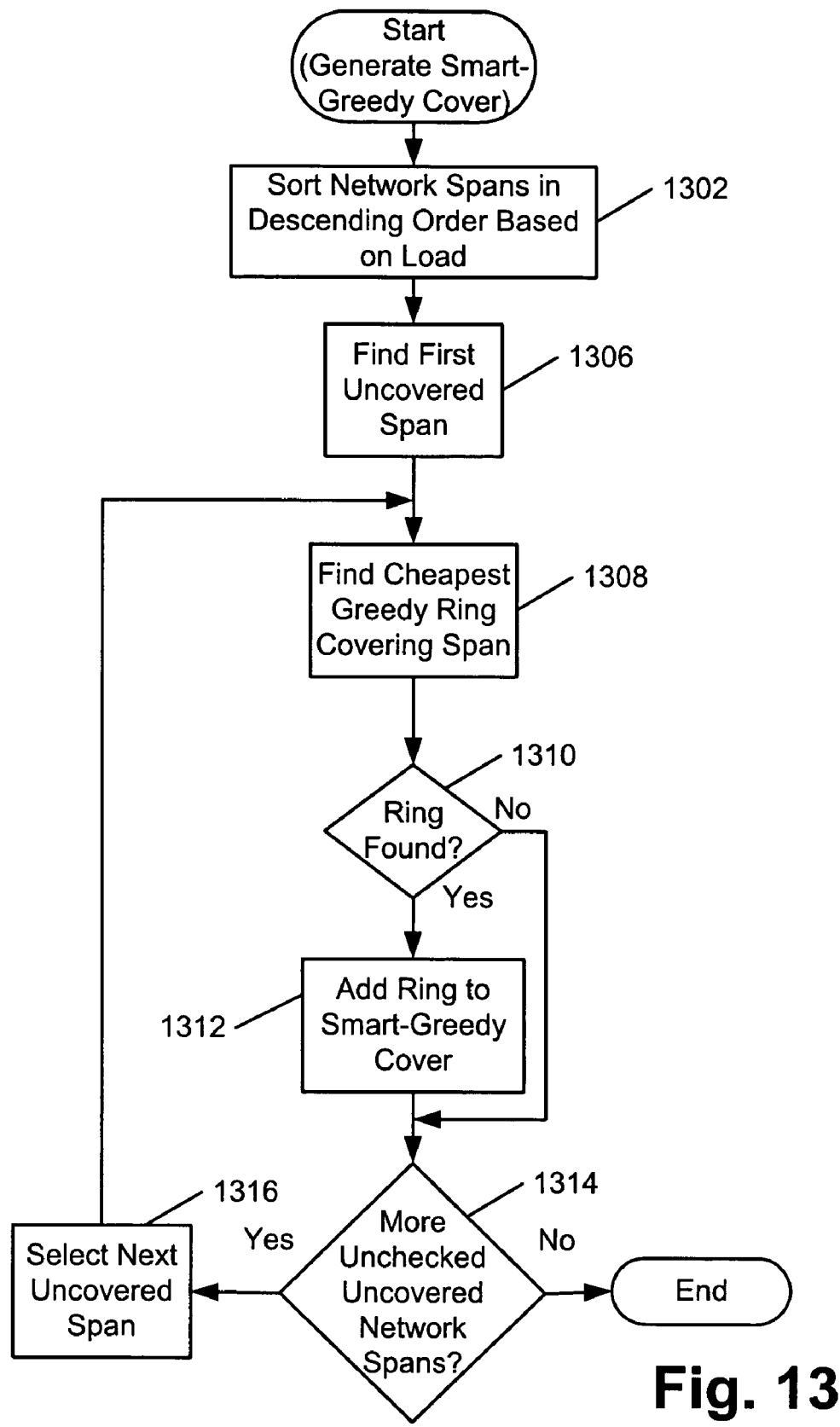
FIG. 13 illustrates a flowchart of an exemplary process that may be implemented in the ring designer tool of FIG. 2 for generating a ring cover candidate using a smart-greedy ring cover algorithm.

FIG. 13 illustrates an exemplary procedure that ring designer 202 may perform to generate the smart-greedy ring cover (act 1006: FIG. 10). Ring designer tool 202 may store the generated ring covers in span linked lists, such that a span covered by one or more rings is linked to the list of rings that cover the span. Ring designer tool 202 may input the greedy ring cover, including the span linked lists, and may sort the network spans in descending order based on load (act 1302). Ring designer tool 202 may then find a first uncovered span (act 1306). If two or more spans are tied for the heaviest loaded uncovered network span, ring designer tool 202 may select the shortest of the heaviest covered spans. Ring designer tool 202 may then traverse the span linked list of the selected span, from the greedy ring cover, to find a cheapest valid ring (having the shortest length) that covers the selected span (act 1308). Ring designer tool 202 may then determine whether a cheapest ring covering the selected span was found (act 1310). If ring designer tool 202 found the cheapest ring that covers the selected span, then ring designer tool 202 may add the ring to a smart-greedy cover and may flag the covered spans covered by the added ring as covered (act 1312). Ring designer tool 202 may then determine whether additional uncovered network spans exist (act 1314). If no additional uncovered network spans exist, the procedure ends, otherwise, ring designer tool 202 may select the next uncovered span from the sorted network span list (act 1316) and processing may return to act 1308 above.

Report Generation

Figure 14:
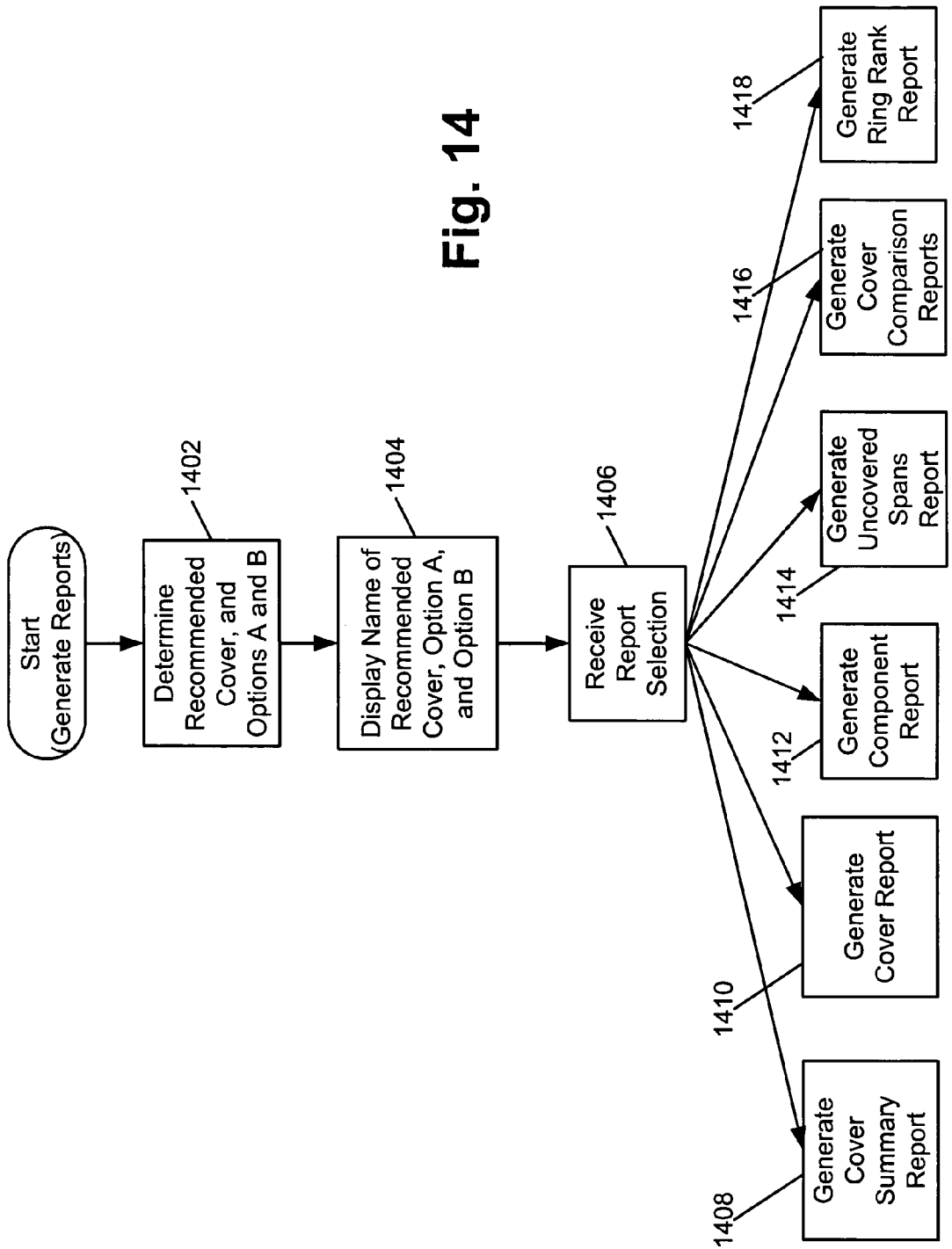
FIG. 14 illustrates a high-level flowchart of an exemplary process that may be implemented in the ring designer tool of FIG. 2 for determining a recommended ring cover and generating reports.

Returning to FIG. 5B, ring designer tool 202 may generate reports regarding the generated ring covers (act 518). FIG. 14 illustrates an exemplary procedure that ring designer 202 may perform to generate reports.

Processing may begin with ring designer tool 202 determining which of the ring cover candidates is a recommended cover, option A cover, and option B cover (act 1402). The recommended cover is one of the ring cover candidates that has rings that cover the most number of loaded spans. The option A cover is the one of the covers that covers the next lower number of loaded spans. The option B cover is the one of the covers that covers the next lower number of loaded spans after the option A cover. When a tie exists because covers that have the same number of loaded spans, ring designer tool 202 may select the cover having the shortest length.

Figure 15A:
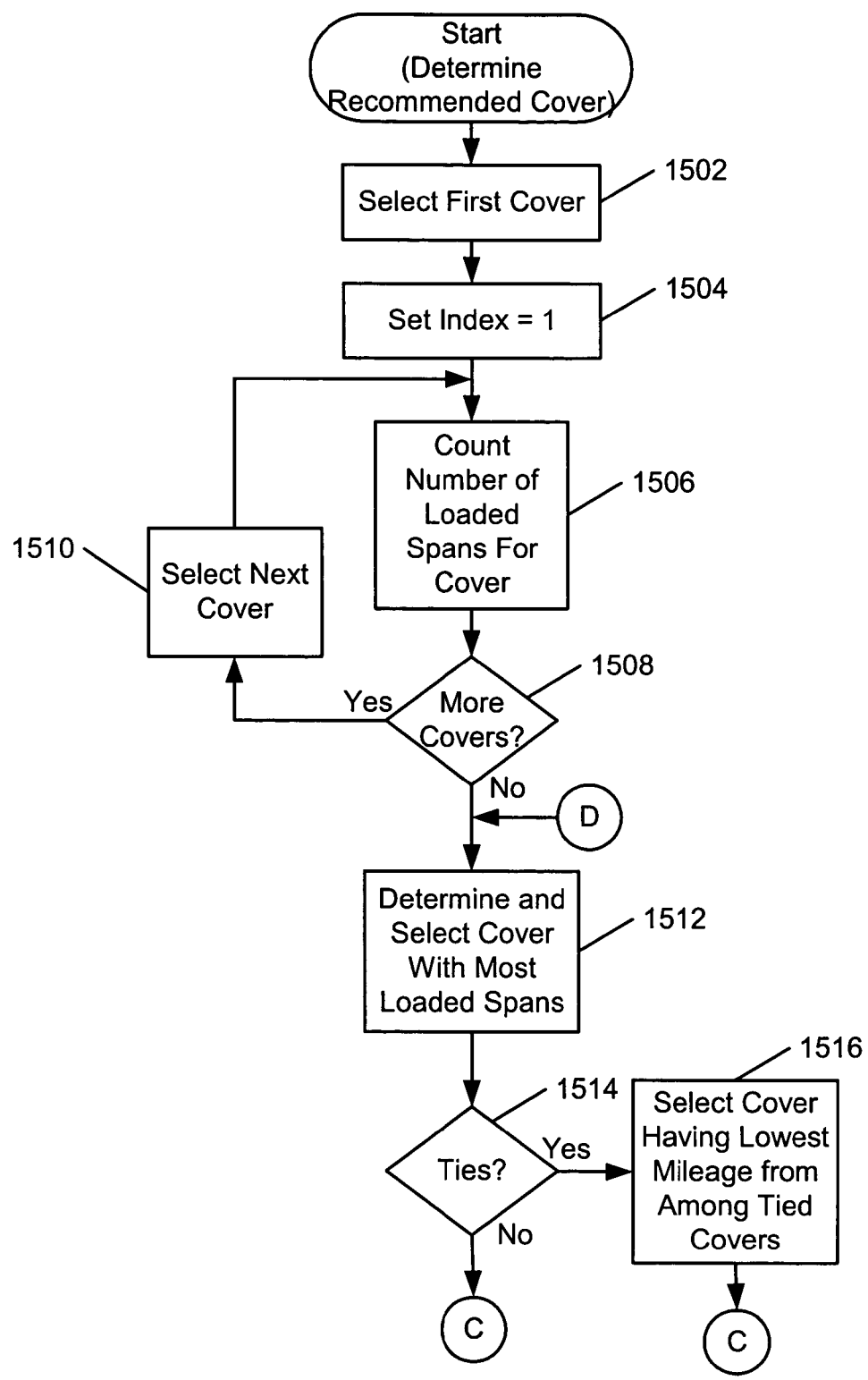
FIGS. 15A-15B illustrate flowcharts of an exemplary process that may be implemented in the ring designer tool of FIG. 2 for determining a recommended ring cover from a group of ring cover candidates.
Figure 15B:
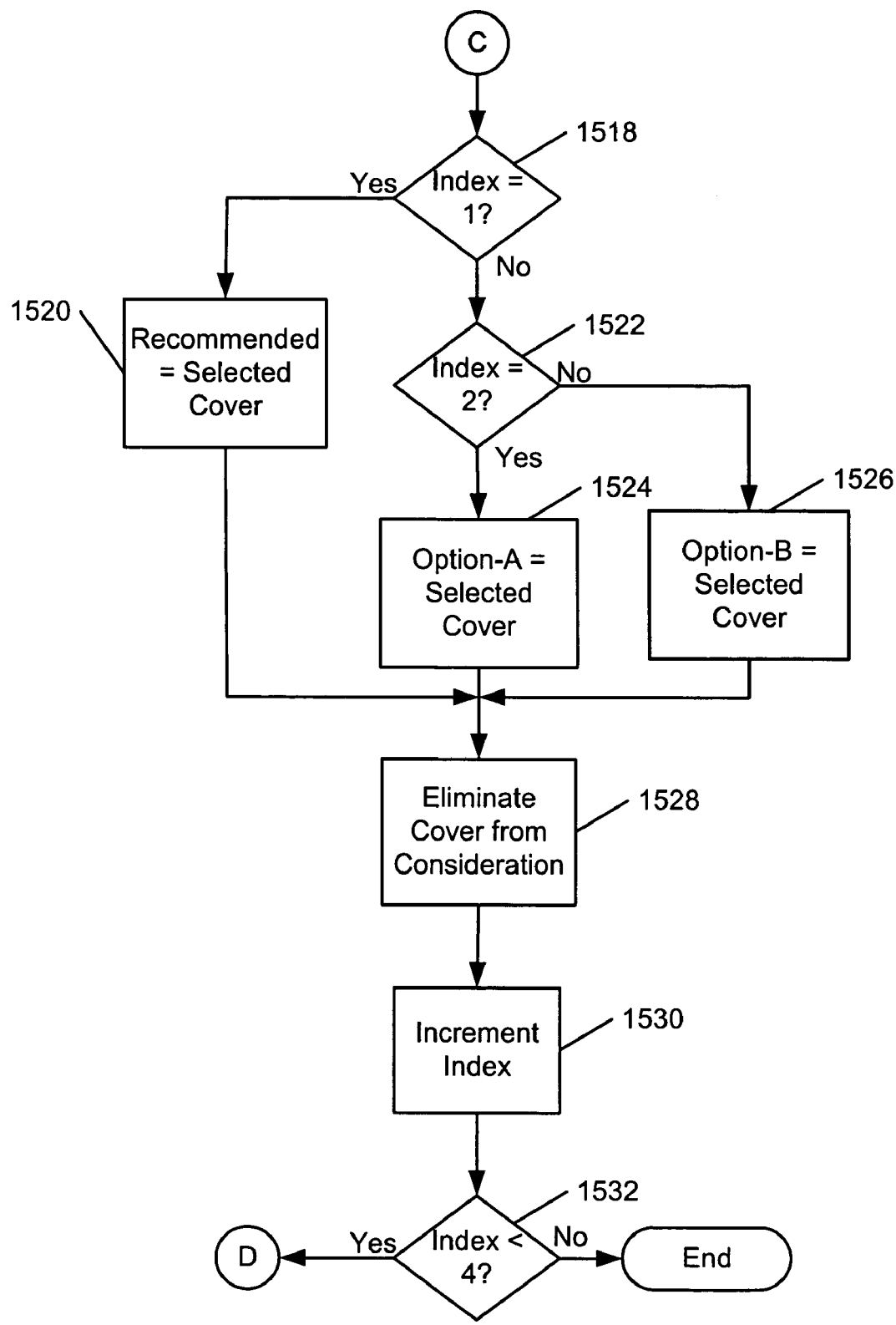

FIGS. 15A-15B are flowcharts that illustrate an exemplary procedure for determining the recommended cover, the option A cover and the option B cover. Ring designer tool 202 may select a first cover candidate (act 1502) and may set a variable, such as index, to 1 (act 1504). Ring designer tool 202 may count the number of loaded spans covered by rings of the cover candidate and may save the number of loaded rings for the selected cover candidate (act 1506). Ring designer 202 may then determine whether more cover candidates exist (act 1508). If another cover candidate exists, then ring designer tool 202 may select the next cover candidate (act 1510) and may count and save the number of loaded spans covered by rings of the selected cover candidate (act 1506).

When ring designer tool 202 determines that no additional cover candidates exist (act 1508), then ring designer tool 202 may determine which of the cover candidates has a highest number of loaded spans by comparing the saved number of loaded spans for each cover (act 1512). If ring designer tool 202 determines that two or more ring candidates are tied for having the highest number of loaded spans (act 1514), then ring designer tool 202 may select the cover candidate having a shortest length (act 1516). If ring designer tool 202 determines that index is equal to 1 (act 1518: FIG. 15B), then ring designer tool 202 may set the recommended cover to be the selected cover having the highest number of loaded spans (act 1520). If ring designer tool 202 determines that index is equal to 2 (act 1522), then ring designer tool 202 may set Option-A to be the selected remaining one of the cover candidates having the highest number of loaded spans (act 1524). If ring designer tool 202 determines that index is not equal to 2 (act 1522), then ring designer tool 202 may set option-B to be the selected remaining one of the cover candidates having the highest number of loaded spans (act 1526). Once a cover has been considered, ring designer tool 202 may eliminate the selected cover from further consideration (act 1528). Ring designer tool 202 may then increment index (act 1530) and may then determine whether index is less than four (act 1532) (note, that three covers may be selected.). If index is not less than four, processing may end, otherwise, ring designer tool 202 may determine which one of the remaining candidate covers under consideration has the highest number of loaded spans (act 1512). Processing continues until the recommended cover, the option-A cover and the option-B cover have been assigned.

Returning to FIG. 14, ring designer tool 202 may display the name of the recommended cover, option-A cover and option-B cover (act 1404). A user may then select a report and may use an input device 360 (FIG. 3), such as a pointing device to select the ring cover and a type of report to generate from options displayed on output device 370 (e.g. a monitor) (act 1406). In other implementations, ring designer tool 202 may automatically generate all reports and cause the reports to be output to an output device, such as a printer or a storage media, such as a hard disk, floppy disk, optical disk, or Random Access Memory (RAM).

According to FIG. 14, when the user selects a report (act 1406), ring designer tool 202 may generate one of a cover summary report (act 1408), a cover report (act 1410, a component report (act 1412), an uncovered spans report (act 1414), cover comparison reports (act 1416), and a ring rank report (act 1418).

Figure 16:
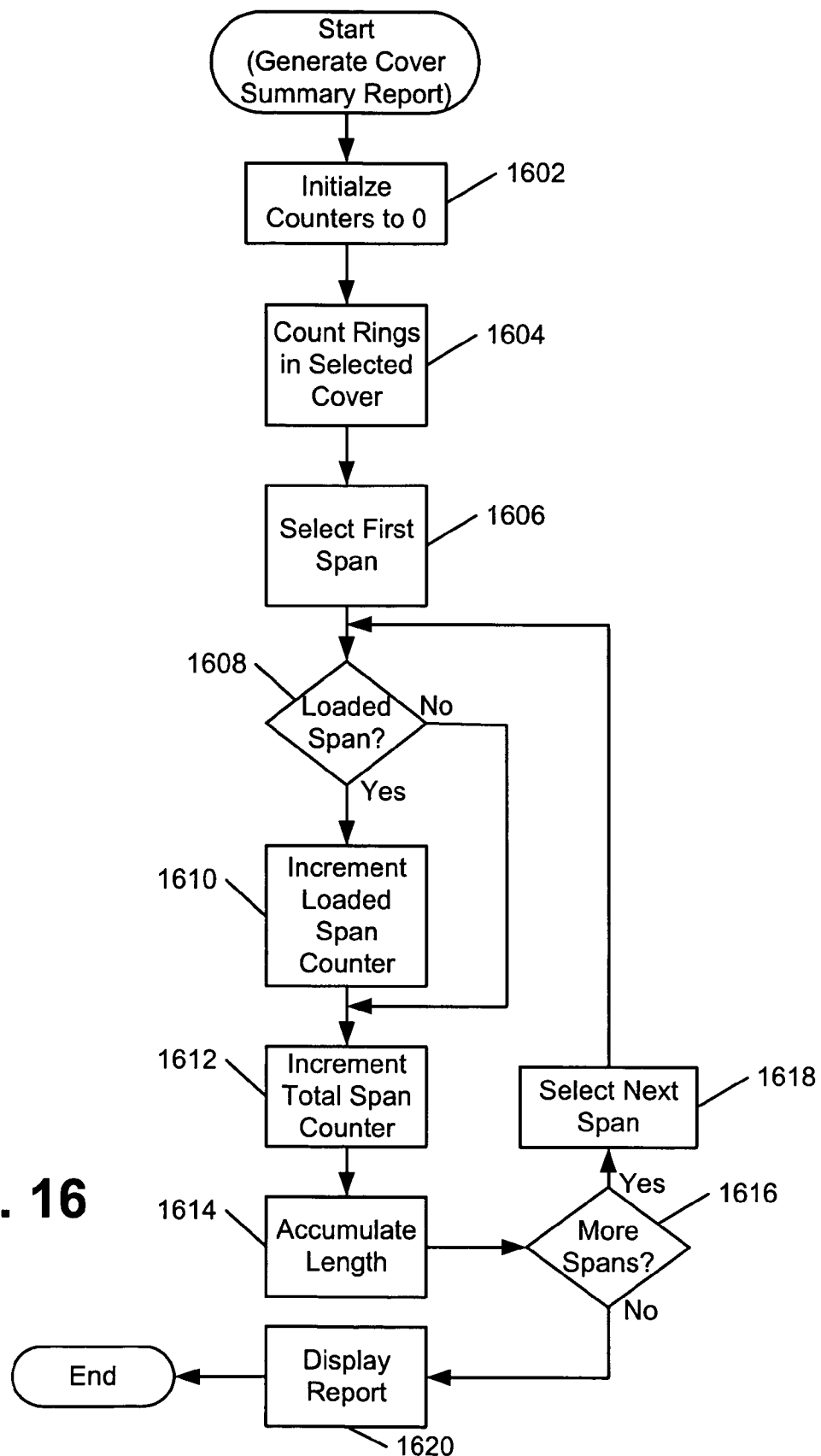
FIG. 16 illustrates a flowchart of an exemplary process that may be implemented in the ring designer tool of FIG. 2 for generating a cover summary report.

FIG. 16 illustrates an exemplary procedure that may be performed by ring designer tool 202 to generate a cover summary report for a selected cover (act 1408: FIG. 14). Ring designer tool 202 may initialize a ring counter, a loaded span counter, a total span counter and a length counter to zero (act 1602). Ring designer tool 202 may then use the ring counter to count the number of rings included in the selected cover (act 1604). Ring designer tool 202 may select a first network span covered by a ring in the selected cover (act 1606) and may determine whether the selected network span is a loaded span (a span with forecasted traffic) (act 1608). If ring designer tool 202 determines that the selected span is a loaded span, then ring designer tool 202 may increment a loaded span counter to count the number of loaded spans (act 1610). Ring designer tool 202 may then increment a total span counter to count the number of spans (act 1612) and may add the length of the selected span to a length counter (act 1614). Ring designer tool 202 may then determine whether any additional network spans exist that are covered by a ring in the selected cover (act 1616). If no additional spans are covered by a ring in the selected cover, then ring designer tool 202 may display the cover summary report (act 1620). Otherwise, ring designer tool 202 may select a next network span covered by a ring in the ring cover (act 1618) and processing may return to act 1608 above.

FIG. 17 shows an exemplary cover summary report that may be produced by ring designer tool 202 as a result of performing the processing described in FIG. 16. The report may include the total number of rings in the cover, the total number of spans covered by rings of the cover, the total distance (in miles) covered by rings and the number of loaded spans covered by rings of the cover.

FIG. 18 shows an exemplary cover report that may be generated by ring designer tool 202 for a selected ring cover (act 1410: FIG. 14). The ring report may include a ring ID, number of nodes included in the ring and length of the ring for each ring included in the cover. The length of each ring may be in miles or any other convenient unit. In the exemplary cover report of FIG. 18, the length of the ring is in miles. By storing ring ID, number of nodes, and ring length in each candidate ring entry of a ring cover, as the ring cover is created, ring designer tool 202 may easily generate the ring cover report from this information. Although the exemplary cover report shows only one ring, typically many rings will be included in the report.

FIG. 19 shows an exemplary component report that may be generated by ring designer tool 202 (act 1412; FIG. 14). The component report may include, for example, components of a ring (e.g. spans). As shown in FIG. 19, the exemplary component report may include a component number 1900, a span ID 1902, an origin of the span 1904, a destination of the span 1906, a length of the span 1908 (in miles or any other convenient unit of measure), a load of the span 1910, total spans 1912 in the ring component, and total loaded spans in the ring component 1914. Ring designer tool 202 may easily generate the component report using the generated ring cover information as well as the input network configuration.

Figure 20:
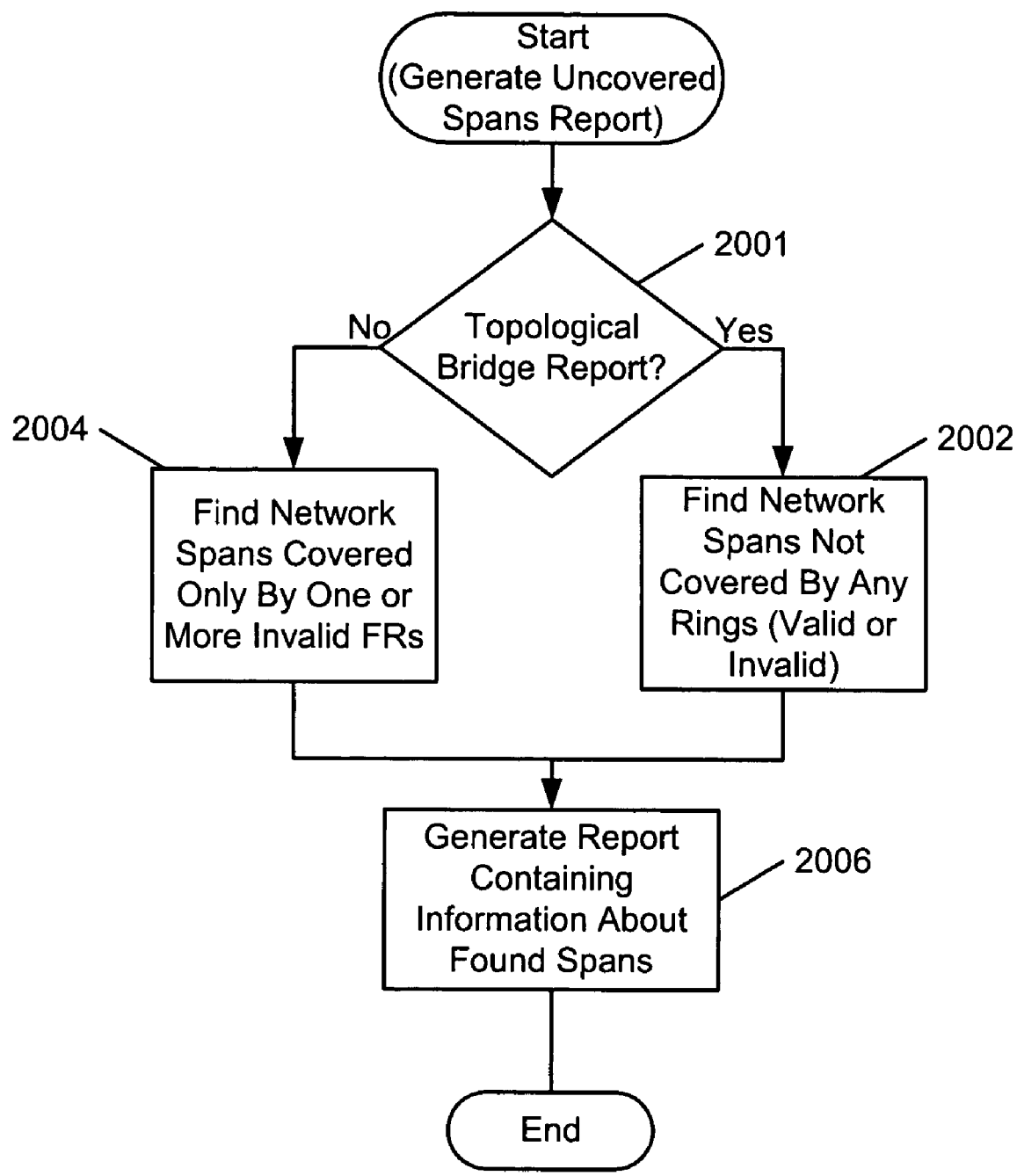
FIG. 20 illustrates a flowchart of an exemplary process that may be implemented in the ring designer tool of FIG. 2 for generating an uncovered spans report.

FIG. 20 is a flowchart that illustrates an exemplary procedure that may be performed by ring designer tool 202 to generate uncovered span reports (act 1414: FIG. 14). Processing may begin with ring designer tool 202 determining whether the user-requested a topological bridge report or an algorithmic bridge report (act 2001). The user may select the bridge report type via input device 360. If the user requested a topological bridge report, then ring designer tool 202 may search a span linked list, representing a selected ring cover, for spans that are not covered by any rings (act 2002). If the user requested an algorithmic bridge report, then ring designer tool 202 may search the span linked list for spans that are covered only by one or more invalid FRs (act 2004). Ring designer tool 202 may then generate either the topological bridge report or the algorithmic bridge report (act 2006). Alternatively, the user may not select a type of bridge report. Instead, ring designer tool 202 may automatically generate both bridge report types.

FIG. 21 shows an exemplary topological bridge report that may be generated by ring designer tool 202. The report may include a span ID, a beginning site and an ending site of the span, a length of the span (in miles or alternatively, in any convenient unit of measure), and a load of the span.

Figure 22A:
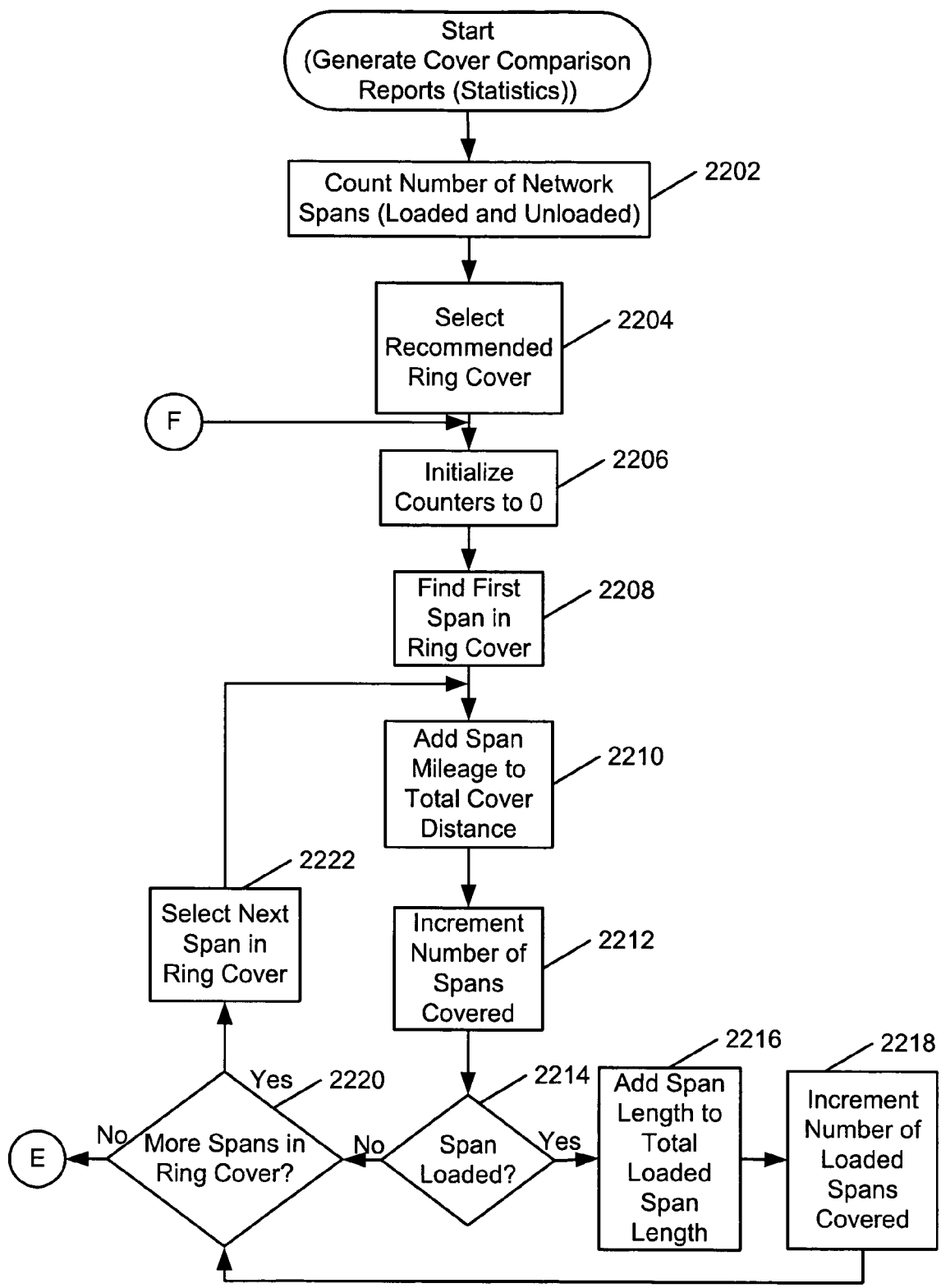
FIGS. 22A-22B illustrate flowcharts of an exemplary process that may be implemented in the ring designer tool of FIG. 2 for generating a cover comparison statistics report.
Figure 22B:
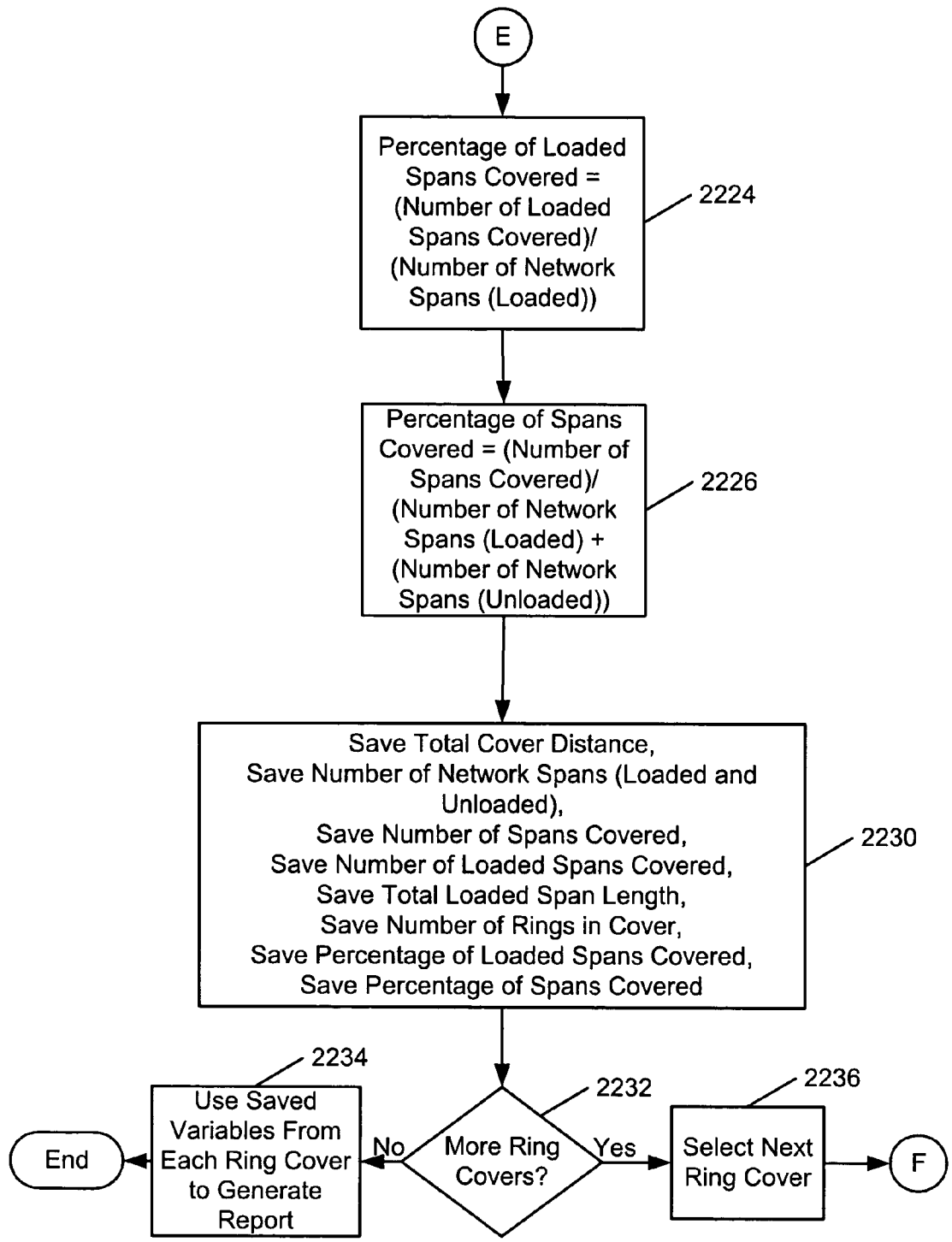

Ring designer tool 202 may generate cover comparison reports (act 1416: FIG. 14), including a statistics comparison report and a performance measures report. FIGS. 22A-22B are flowcharts that illustrate an exemplary procedure for generating a statistics comparison report that may be performed by ring designer tool 202. Processing may begin with ring designer tool 202 counting the number of loaded and unloaded spans in the network (act 2202). Ring designer tool 202 may then select the recommended cover (act 2204) and initialize a span length counter, a number of spans covered counter, a total loaded span length counter, a number of loaded spans covered counter to zero (act 2206). Ring designer tool 202 may find a first span in the selected ring cover (act 2208) by traversing a span linked list for the ring cover, may add the length of the span (in mileage or any other convenient unit of measurement) to a total cover distance counter (act 2210), and may increment a number of spans covered counter (act 2212). Ring designer tool 202 may then determine whether the span is a loaded span (a span with predicted traffic) (act 2214). If the span is a loaded span, ring designer tool 202 may add the length of the span to a total loaded span length counter (act 2216) and may increment a number of loaded spans covered counter (act 2218). Ring designer tool 202 may then determine whether there are additional spans covered by one or more rings of the ring cover (act 2220) and if there are additional covered spans, ring designer tool 202 may select a next span of the ring cover (act 2222) and may again increase the total cover distance counter (act 2210), the number of spans covered counter (act 2212), the total loaded span length counter (act 2216) and the number of loaded spans covered counter (act 2218).

When ring designer tool 202 determines that no additional spans exist in the ring cover (act 2220), ring designer tool 202 may determine a percentage of loaded spans covered by dividing the number of loaded spans covered by the number of network spans that are loaded (act 2224: FIG. 22B) and may determine a percentage of spans covered by dividing the number of spans covered by the sum of the number of network spans that are loaded and the number of network spans that are not loaded (act 2226). Ring designer tool 202 may then save a number of counters including the total cover distance counter, the number of network spans that are loaded, the number of network spans that are not loaded, the number of spans covered counter, the number of loaded spans covered counter, the total loaded span length counter, the number of rings in the cover, the percentage of loaded spans covered, and the percentage of spans covered (act 2230). Ring designer tool 202 may then determine whether another cover exists, such as option A cover, option B cover, and base cover (act 2232). If another cover exists, then ring designer tool 202 may select the next cover and continue the procedure by traversing the spans in the cover and increasing the appropriate counters (acts 2206-2230). If ring designer tool 202 determines that no additional ring covers exits (act 2232), then the saved counters from the different ring covers may be used to generate the statistics report (act 2234). In one implementation, ring designer tool 202 may display the report to the user. In another implementation, ring designer tool 202 may save the report in storage or may output the report to a printer.

FIG. 23 is an exemplary statistics comparison report that may be generated by ring designer tool 202. The report may include, for each of the recommended cover, option A, option B and the base cover, length of the cover, maximum coverable spans, number of spans covered, percentage of spans covered, maximum coverable loaded spans, number of loaded spans covered, percentage of loaded spans covered, total length of loaded spans, and number of rings in the cover.

Figure 24A:
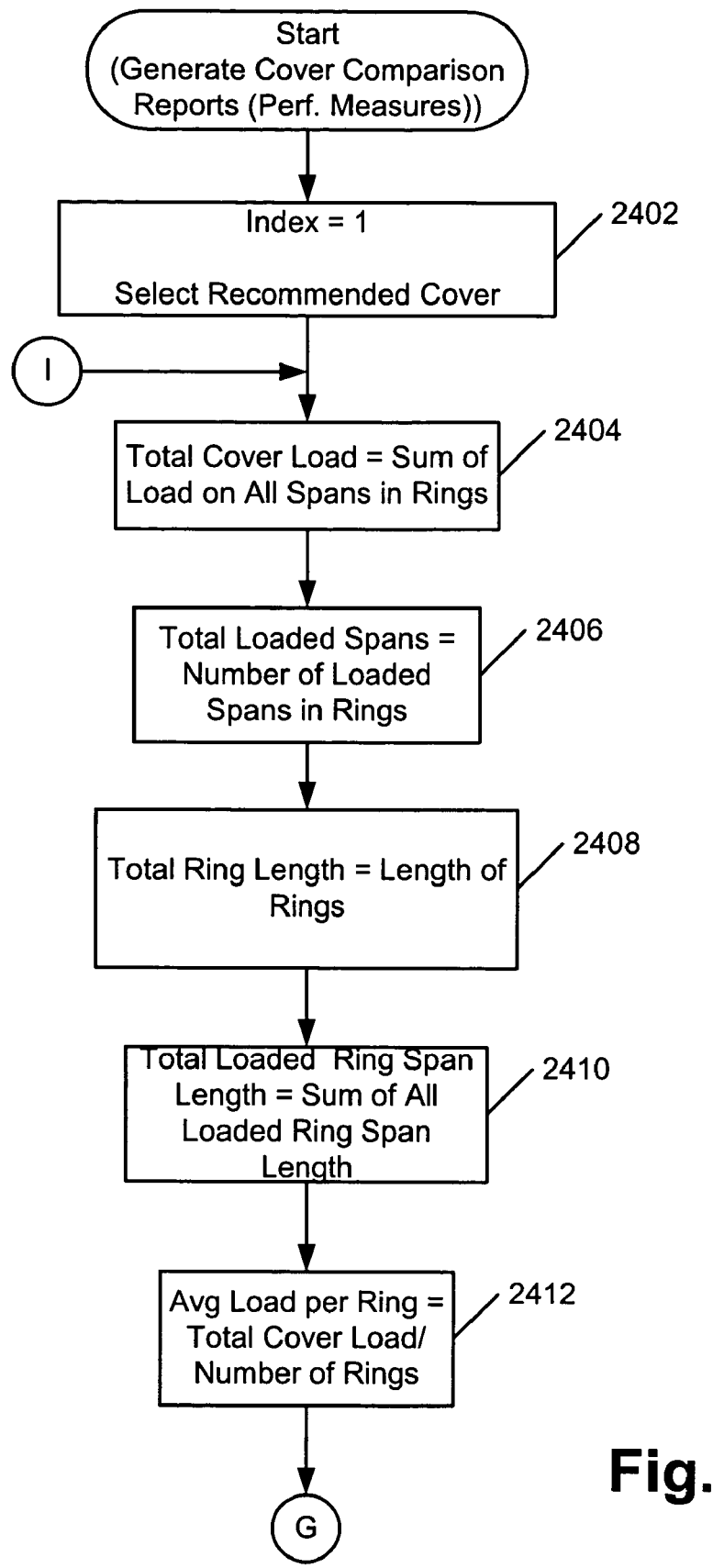
FIGS. 24A-24C illustrate flowcharts of an exemplary process that may be implemented in the ring designer tool of FIG. 2 for generating a cover comparison statistics report.
Figure 24B:
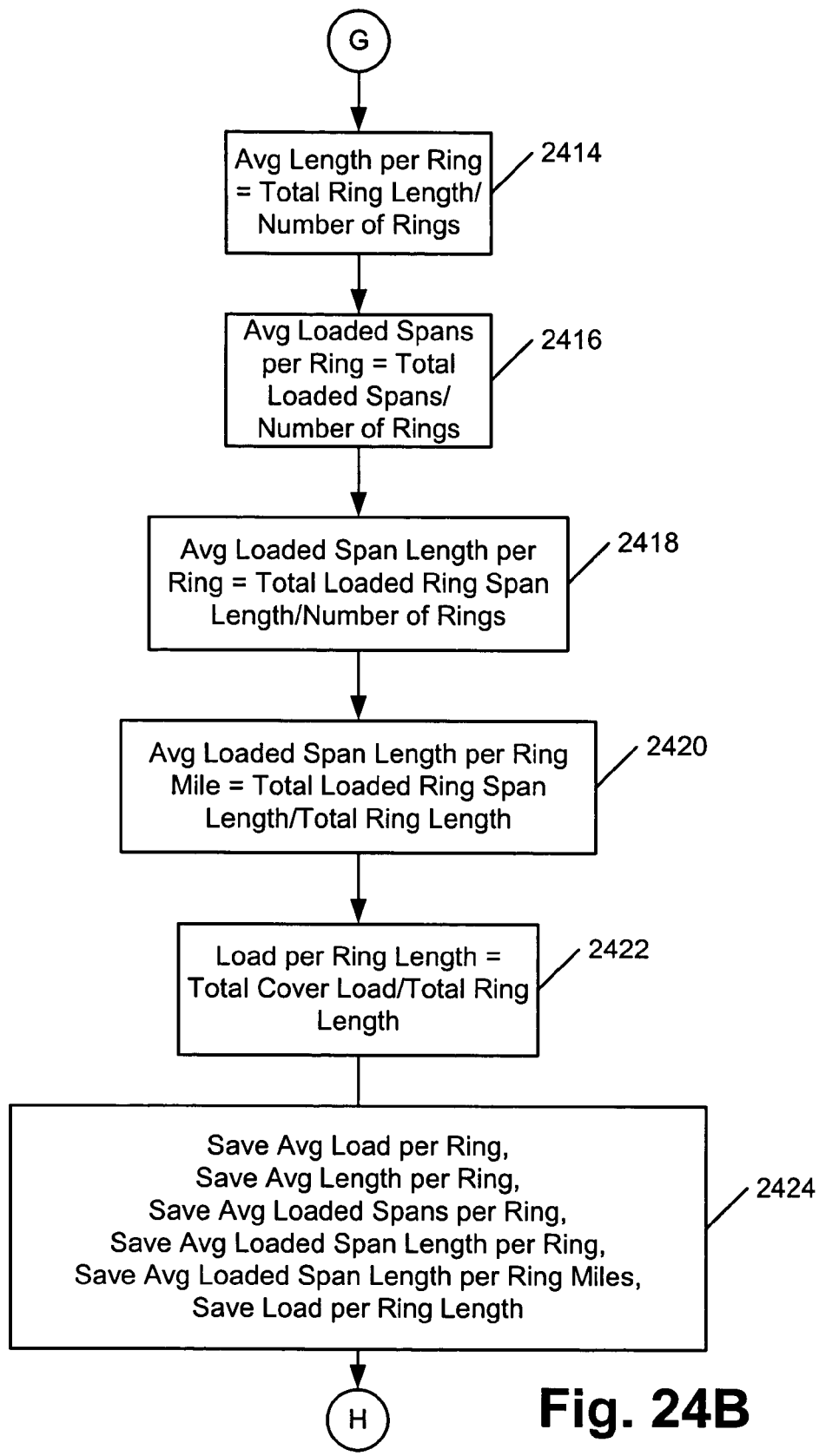
Figure 24C:
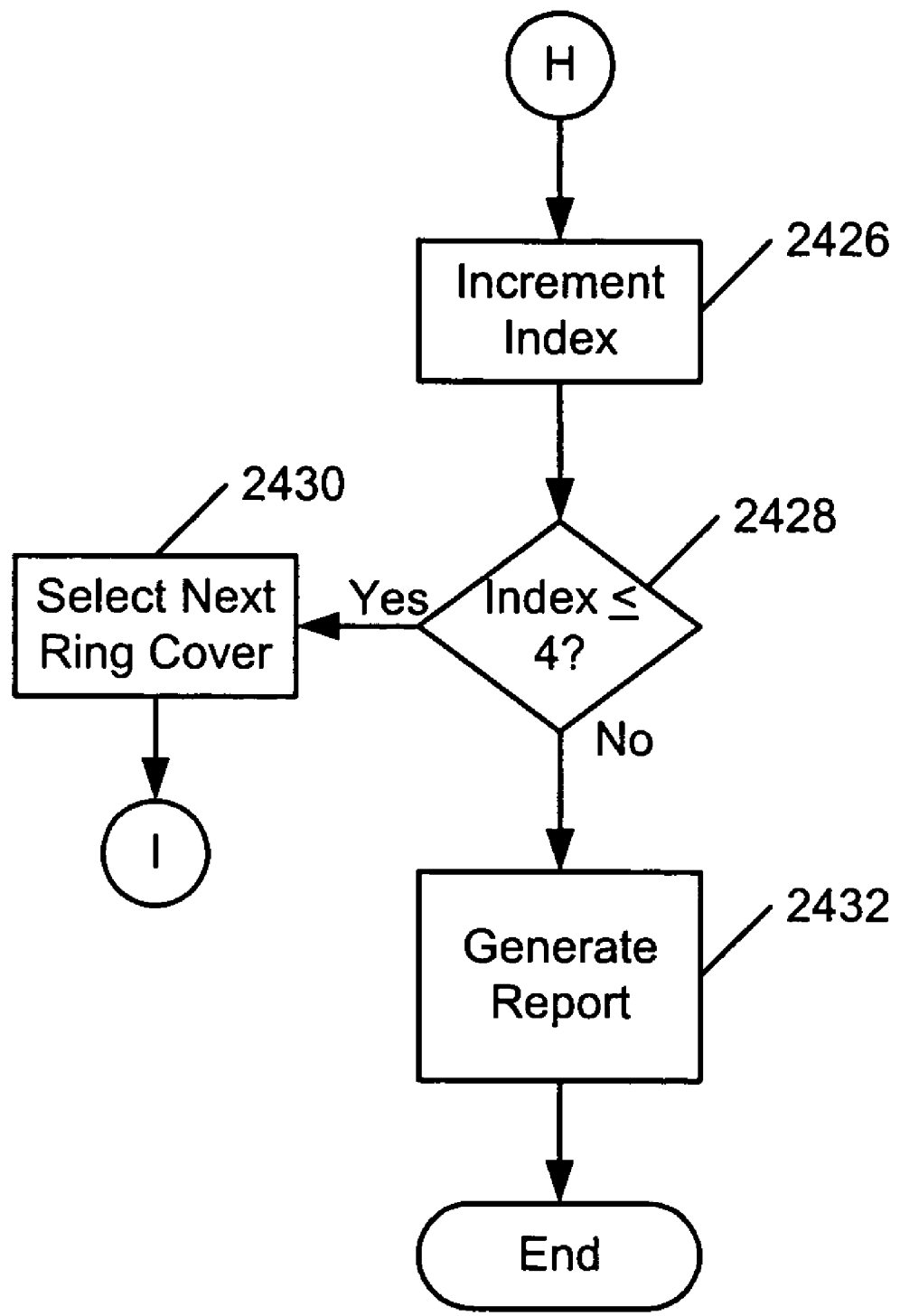

FIG. 24A-24C are flowcharts that illustrate an exemplary procedure that may be performed by ring designer tool 202 to generate a performance measures cover comparison report (act 1416: FIG. 14). According to the exemplary procedure, ring designer tool 202 may set an index variable to 1 (act 2402), may select the first cover, recommended cover (act 2402), may set total cover load to be equal to the sum of all of loads on covered spans (act 2404), may set total loaded spans to be equal to the number of loaded spans in the rings of the selected ring cover (act 2406), may set total ring length to be equal to the length (in miles) of spans included in rings (act 2408), and may set total loaded ring span length to be equal to a sum of lengths of all covered loaded ring spans (act 2410).

Ring designer tool 202 may calculate average load per ring by dividing total cover load by number of rings in the cover (act 2412), may calculate average length per ring by dividing total ring length by the number of rings (act 2414), may calculate average loaded spans per ring by dividing total loaded spans by number of rings (act 2416), may calculate average loaded span length per ring by dividing total loaded ring span length by number of rings (act 2418), may calculate average loaded span length per ring length by dividing total loaded ring span length by total ring length (act 2420), and may calculate load per ring length by dividing total cover load by total ring length (act 2422). Ring designer tool 202 may then save average load per ring, average length per ring, average loaded spans per ring, average loaded span length per ring, average loaded span length per ring length, and load per ring length for the current ring cover (act 2424).

Ring designer tool 202 may then increment the index (act 2426: FIG. 24C) and determine whether the index is less than or equal to four (act 2428), indicating that additional ring covers need to be analyzed (recommended cover, option A, option B, base cover). If index is less than or equal to 4, the ring designer tool 202 may select a next cover (act 2430), perform the above calculations for the selected ring cover (acts 2402-2422), and save the results (act 2424). When ring designer tool 202 determines that the index is not less than or equal to four, ring designer tool 202 may generate the performance measures report (act 2432). As with the reports above, ring designer tool 202 may provide the report to the user.

FIG. 25 shows an exemplary performance measures report that may be generated by ring designer tool 202. The report may include for the recommended cover, option A, option B and base cover, average load per ring, average length per ring, average loaded spans per ring, average loaded span length per ring, loaded span length per ring length and load per ring length. Ring designer tool 202 may cause the report to be displayed on a monitor of the ring designer tool 202 or alternatively, may output the report to a printer or to storage.

FIG. 26 shows an exemplary ring rank report that may be generated by ring designer tool 202 for a selected ring cover, such as the recommended cover (act 1418: FIG. 14). The report may include ring IDs, length of ring in miles or any other convenient unit of measure, total number of spans in each ring, total loaded spans in each ring, total loaded spans in the ring that are unique to the ring (not covered by any other ring in the cover), rank of each ring, weighted benefit cost (WBC) of each ring, cumulative benefit of each ring, cumulative cost for each ring and cumulative benefit/cumulative cost (CBC) ratio for each ring.

Ring designer tool 202 may calculate a rank of each ring by dividing the number of loaded spans that are unique to the ring by the total number of spans covered by the ring. Thus, a rank of 1 indicates that all spans in the ring are loaded and are unique to the ring.

Ring designer tool 202 may calculate WBC, which is a second rank of each ring in a ring cover, by dividing the sum of all loaded span length covered uniquely by the total ring length. The sum of all loaded span length covered uniquely is a measure of the benefit that the ring provides, while total ring length is a measure of the cost of providing that benefit. The benefit is weighted due to the manner in which ring designer tool 202 may calculate unique loaded span length. For example, if a span is covered by more than one ring, then each ring will have an equal benefit for covering that span. Thus, if a span is covered by four rings, then ring designer tool 202 may use ¼ of the span length when computing the ring's benefit. The full span length will contribute to the cost of the ring.

Cumulative benefit and cumulative cost provide a running count of the total benefit and total cost of the cover as the cover is gradually built, one ring at a time. Ring designer tool 202 may order the rings in descending order based on each ring's WBC. Ring designer tool 202 may then add the rings to the cover, one ring at a time, starting with the ring having the highest WBC. Each added ring will bring a benefit and a cost to the cover. While calculating the benefit, only those spans that have not been covered thus far in the cover will contribute to the ring's benefit and a previously covered span will contribute only to the cost of the ring. Ring designer tool 202 may maintain a count of the cumulative benefit and the cumulative cost of the cover. Thus, ring designer tool 202 may provide users with an alternative of stopping with a cover that has a certain cumulative cost, or a certain value of the CBC ratio.

Although, many of the above exemplary reports and exemplary procedures for generating the reports may refer to mileage, any other convenient measure of distance may be used, such as kilometers.

Embodiments of the invention may be implemented in hardware, software, or firmware. The firmware may be in a Read-Only Memory (ROM) and the software may reside on, for example, a medium such as a floppy disk, optical disk, or CD ROM.

Conclusion

The foregoing description of the preferred embodiments of the present invention are provided for illustration and description, but is not intended to be limiting or to limit the invention to the precise form disclosed. Modifications and variations are possible in light of the above teachings or may be acquired from practice of the invention. For example, while series of acts have been described with regard to FIGS. 5A-16, 20, 22A-22B and 24A-24C, the order of the acts may differ in other implementations consistent with the present invention. Also, non-dependent acts may be performed in parallel.

No element, act or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

APPENDIX

Theorem: For two fundamental rings, $FR_1$ and $FR_2$ with one common span, $FR_1 \oplus FR_2$, is a simple ring.

Proof: Let $FR_1$ and $FR_2$ be fundamental rings with m nodes and spans, and p nodes and spans, respectively. Further, let these two rings have a common span.

We claim that if $FR_1$ and $FR_2$ are fundamental rings with one common span, then the induced subgraph of $FR_1 \cup FR_2$ will always have m+p−1 spans and m+p−2 nodes.

Assuming that the previous statement is not true, then the only non-trivial possibility is that the induced subgraph of $FR_1 \cup FR_2$ has m+p spans and m+p−2 nodes.

Distinct fundamental rings are obtained by adding distinct chords to spanning trees.

Let c1 and c2 be respective distinct chords in $FR_1$ and $FR_2$.

The spanning tree of $FR_1 \cup FR_2$ is $FR_1 \cup FR_2 \backslash c1 \backslash c2$.

Here is a spanning tree that has m+p−2 nodes and m+p−2 spans.

This is a contradiction because a tree on k nodes has k−1 spans.

Hence the assumption is wrong.

Hence, $FR_1 \cup FR_2$ will always have m+p−1 spans if it has m+p−2 nodes.

Hence, $FR_1 \oplus FR_2$ will always have m+p−2 nodes and m+p−2 spans if $FR_1$ and $FR_2$ have a span in common.

Since $FR_1 \oplus FR_2$ is connected, it is a simple ring.

Q.E.D.

Since all the common spans will be contiguous, the above result can easily be extended to fundamental rings with more than one common span.

What is claimed is:

1. A processor-implemented method comprising:
   receiving, at the processor, network configuration information and traffic demand information for a network;
   generating, by the processor, a plurality of ring cover candidates, each ring cover candidate including a plurality of rings, based on the network configuration information and the traffic demand information, each of the rings including a plurality of network spans, where the generating the ring cover candidate includes generating the plurality of ring cover candidates by using a different process to generate each of the ring cover candidates, wherein the plurality of ring cover candidates vary in cost;
   counting, for each ring cover candidate of the plurality of ring cover candidates, a number of loaded network spans covered by the ring cover candidate; and
   selecting one of the plurality of ring cover candidates as a recommended ring cover candidate by selecting the one of the ring cover candidates having a highest number of loaded network spans.

2. The processor-implemented method of claim 1, further comprising
   generating and outputting at least one report describing characteristics of the ring cover candidate.

3. The processor-implemented method of claim 1, where the generating the ring cover candidate comprises creating a spanning tree from a plurality of loaded network spans of the network.

4. The processor-implemented method of claim 3, where the generating the ring cover candidate further comprises:
   adding one or more chords to the spanning tree to create a plurality of first rings;
   generating a plurality of second rings by combining two of the plurality of first rings; and
   generating a plurality of third rings by combining one of the second rings with one of the first rings.

5. The processor-implemented method of claim 4, where the generating a plurality of third rings comprises generating derived third degree rings and focused third degree rings.

6. The processor-implemented method of claim 4, where at least some of the third rings and the second rings are based on an invalid first ring.

7. The processor-implemented method of claim 4, further comprising storing information regarding the first rings, the second rings and the third rings in span-linked lists associated with respective ones of a plurality of network spans covered by the first rings, the second rings and the third rings.

8. The processor-implemented method of claim 1, the generating the plurality of ring cover candidates comprising:
   generating a first ring cover candidate by using cheapest ones of the rings formed on loaded network spans,
   generating a second ring cover candidate by using cheapest ones of the rings formed on a maximum number of uncovered network spans, and generating a third ring cover candidate by using cheapest ones of the rings from the first ring cover candidate.

9. The processor-implemented method of claim 2, where the at least one report includes characteristics of each of the rings included in the ring cover candidate.

10. The processor-implemented method of claim 9, where the characteristics of each of the rings include a ring identifier, a number of nodes covered by a corresponding one of the rings, and a length of the corresponding one of the rings.

11. The processor-implemented method of claim 2, where the at least one report includes information about network spans not covered by any valid ones of the rings of the ring cover candidate.

12. The processor-implemented method of claim 2, where the at least one report includes information about network spans not covered by any ones of the rings of the ring cover candidate.

13. The processor-implemented method of claim 2, where the at least one report provides characteristics of each of the plurality of ring cover candidates.

14. An apparatus comprising: at least one storage device to store instructions; and at least one processor to execute the instructions to:
generate a plurality of ring cover candidates based on configuration information and traffic demand information associated with a network, where the at least one processor generates the plurality of ring cover candidates using a different set of parameters to generate each of the ring cover candidates, wherein the plurality of ring cover candidates vary in cost;
count, for each ring cover candidate of the plurality of ring cover candidates, a number of loaded network spans covered by the ring cover candidate, and
select one of the plurality of ring cover candidates as a recommended ring cover candidate by selecting the one of the ring cover candidates having a highest number of loaded network spans.

15. The apparatus of claim 14, where the at least one processor is to generate a report describing characteristics of the selected one of the ring cover candidates.

16. The apparatus of claim 14, where the at least one processor is to generate a plurality of rings for each of the plurality of ring cover candidates, the plurality of rings including a plurality of fundamental rings, a plurality of second degree rings, and a plurality of third degree rings.

17. The apparatus of claim 14, where the at least one processor is further to store each of the rings of the plurality of ring cover candidates in span linked lists associated with ones of a plurality of network spans of the network covered by the rings in the at least one storage device.

18. The apparatus of claim 14, where, when generating the plurality of ring cover candidates, the at least one processor is:
to generate a first ring cover candidate by using shortest ones of the rings formed on loaded network spans,
to generate a second ring cover candidate by using shortest ones of the rings formed on a maximum number of uncovered network spans, and
to generate a third ring cover candidate by using shortest ones of the rings from the first ring cover candidate.

19. The apparatus of claim 14, where the at least one processor is further to rank each of a plurality of rings included in the plurality of ring cover candidates, the rank being based on a measure of a benefit of including a respective ring in the plurality of ring cover candidates versus a measure of a cost of including the respective ring in the plurality of ring cover candidates.

20. A system comprising:
means for receiving network configuration information and information representing predicted traffic demand for a network;
means for generating a plurality of ring cover candidates using a different process to generate each of the ring cover candidates, based on the network configuration information and the information representing predicted traffic demand, each of the ring cover candidates including a plurality of rings, and each of the rings including a plurality of network spans, wherein the plurality of ring cover candidates vary in cost;
means for counting, for each ring cover candidate of the plurality of ring cover candidates, a number of loaded network spans covered by the ring cover candidate; and
means for selecting one of the ring cover candidates as a recommended ring cover candidate, the recommended ring cover candidate having a highest number of loaded network spans.

21. A hardware memory device having recorded thereon instructions for at least one processor, the instructions comprising instructions for the at least one processor to perform a method, the method comprising:
generating a plurality of ring cover candidates for a network by using a different procedure to select a respective plurality of rings for each of the ring cover candidates, the generation of the ring cover candidates being based on configuration information and information representing predicted traffic demand associated with the network, each of the rings including a plurality of network spans, wherein the plurality of ring cover candidates vary in cost;
counting, for each ring cover candidate of the plurality of ring cover candidates, a number of loaded network spans covered by the ring cover candidate; and
selecting one of the ring cover candidates as a recommended ring cover candidate, the recommended ring cover candidate having a highest number of loaded network spans.

22. The hardware memory device of claim 21, where the method further comprises:
creating a spanning tree based on loaded ones of the network spans,
generating a plurality of fundamental rings based on the spanning tree, and
generating a plurality of rings based on the generated fundamental rings.

23. The hardware memory device of claim 22, where the plurality of rings generated based on the generated fundamental rings include at least one of second degree rings or third degree rings.

24. The hardware device of claim 22, where the method further comprises:
creating a focused third degree ring to cover a network span when the network span is covered only by an invalid fundamental ring.

25. The hardware memory device of claim 22, where:
the plurality of rings generated based on the generated fundamental rings are formed by combining a fundamental ring with another of the rings, and
the fundamental ring and the other of the rings have a network span in common.

26. The hardware memory device of claim 21, where the method further comprises:
calculating a ranking of each of the rings in at least one of the ring cover candidates, the ranking being based on a benefit gained by including a respective ring in the at least one ring cover candidate versus a measure of a cost incurred by including the respective ring in the at least one ring cover candidate.

27. The hardware memory device of claim 21, where the method further comprises:

generating at least one report that describes characteristics of at least one of the ring cover candidates.

* * * * *